(12) United States Patent
Shibutani

(10) Patent No.: US 6,889,056 B2
(45) Date of Patent: May 3, 2005

(54) TRANSMISSION CONTROL SCHEME

(75) Inventor: Akira Shibutani, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 531 days.

(21) Appl. No.: 09/846,021

(22) Filed: Apr. 30, 2001

(65) Prior Publication Data

US 2002/0193133 A1 Dec. 19, 2002

(51) Int. Cl.$^7$ ............................................... H04B 7/00

(52) U.S. Cl. ......................... 455/522; 455/69; 455/63; 455/452

(58) Field of Search .................. 455/69, 126, 522, 455/13.1, 63, 424; 370/252

(56) References Cited

U.S. PATENT DOCUMENTS

| | | | | |
|---|---|---|---|---|
| 4,765,753 | A | * 8/1988 | Schmidt | 370/332 |
| 5,239,673 | A | * 8/1993 | Natarajan | 455/426.1 |
| 5,812,938 | A | * 9/1998 | Gilhousen et al. | 455/69 |
| 6,044,067 | A | * 3/2000 | Suzuki | 370/252 |
| 6,067,458 | A | * 5/2000 | Chen | 455/522 |
| 6,334,047 | B1 | * 12/2001 | Andersson et al. | 455/69 |
| 6,366,602 | B1 | * 4/2002 | Raitola | 375/135 |
| 6,657,980 | B2 | * 12/2003 | Holtzman et al. | 370/329 |
| 2002/0107013 | A1 | * 8/2002 | Fitzgerald | 455/423 |
| 2002/0165004 | A1 | * 11/2002 | Chen et al. | 455/522 |

OTHER PUBLICATIONS

F. Adachi et al., "Wideband DS–CDMA for Next–Generation Mobile Communications Systems", IEEE Communication Magazine, vol. 36, pp. 56–69, Sep. 1998.

3$^{rd}$ Generation Partnership Project 2, "cdma 2000 High Rate Packet Data Air Interface Specification", 3GPP2 C.S0024, Sep. 12, 2000.

A. Jalali et al., "Data Throughput of CDMA–HDR a High Efficiency–High Data Rate Personal Communication Wireless System", IEEE VTC2000–Spring, pp. 1854–1858, Tokyo, May 2000.

T. Ue et al., "Symbol Rate and Modulation Level–Controlled Adaptive Modulation/TDMA/TDD System for Personal Communication Systems", IEEE Vehicular Technology Conference 0098–3551, vol. 45/V1, pp. 306–310, Jul. 1995.

(Continued)

*Primary Examiner*—Nick Corsaro
*Assistant Examiner*—Trinh Tan
(74) *Attorney, Agent, or Firm*—Brinks Hofer Gilson & Lione

(57) ABSTRACT

The present invention provides a transmission control scheme for wireless digital networks comprised of a plurality of access points each communicating with access terminals, which improves data throughput to access terminals located in areas where interference from the neighboring access points are high. Generally, under the transmission control scheme according to the present invention, the access points are controlled so that neighboring access points will not transmit signals simultaneously with transmission parameters providing high robustness. The transmission parameters include, for instance, transmission power, a modulation scheme and a coding rate. Higher power transmission achieves higher robustness. Transmission at a lower modulation level achieves higher robustness. Transmission at a lower coding rate achieves higher robustness. Transmission providing high or low robustness will expand or narrow a virtual communication zone, which is defined in this application as an area within which it is feasible at a given level of error performance for access terminals to communicate with the access point in the zone. The access points may change their transmission parameters according to predetermined schedules, such as at regular intervals.

20 Claims, 15 Drawing Sheets

OTHER PUBLICATIONS

S. Sampei et al., "Adaptive Modulation/TDMA Scheme for Large Capacity Personal Multi–Media Communication Systems", IEICE Trans. Commun., vol. E77–B, No. 9, Sep. 1994.

A. Yamaguchi et al., "Forwardlink Packet Scheduler for Packet Data System", IEICE General Conference, Mar. 26–29, 2001.

A. Fujiwara et al., "Link Adaptation Method Using Fading Frequency for High–Speed Packet Transmission with Adaptive Modulation and Coding Scheme in DS–CDMA Mobile Radio", IEICE, The 2000 Communications Society Conference, B–5–79, p. 367, Sep. 30–Oct. 3, 2000.

K. Higuchi et al., "Throughput Performance of High–Speed Packet Transmission Using Multi–Level Mudolation in W–CDMA Forward Link", IEICE, The 2000 Communications Society Conference, SB–11–7, pp. 531–532, Sep. 30–Oct. 3, 2000.

N. Kinoshita et al., "Field Experiments on 16QAM/TDMA and Trellis Coded 16QAM/TDMA Systems for Digital Land Mobile Radio Communications", IEICE Trans. Commun., vol. E77–B, No. 7, Jul. 1994.

* cited by examiner

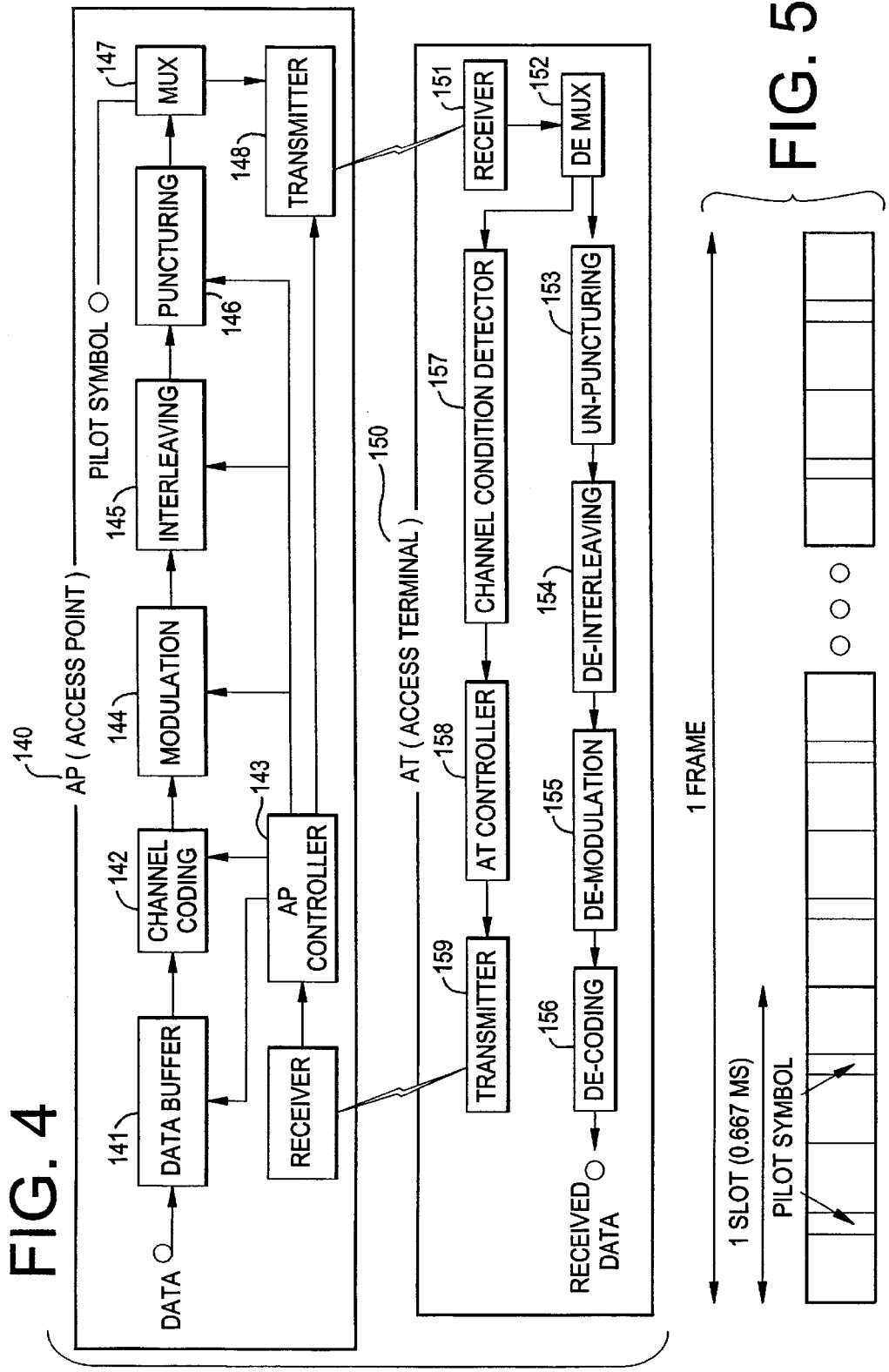

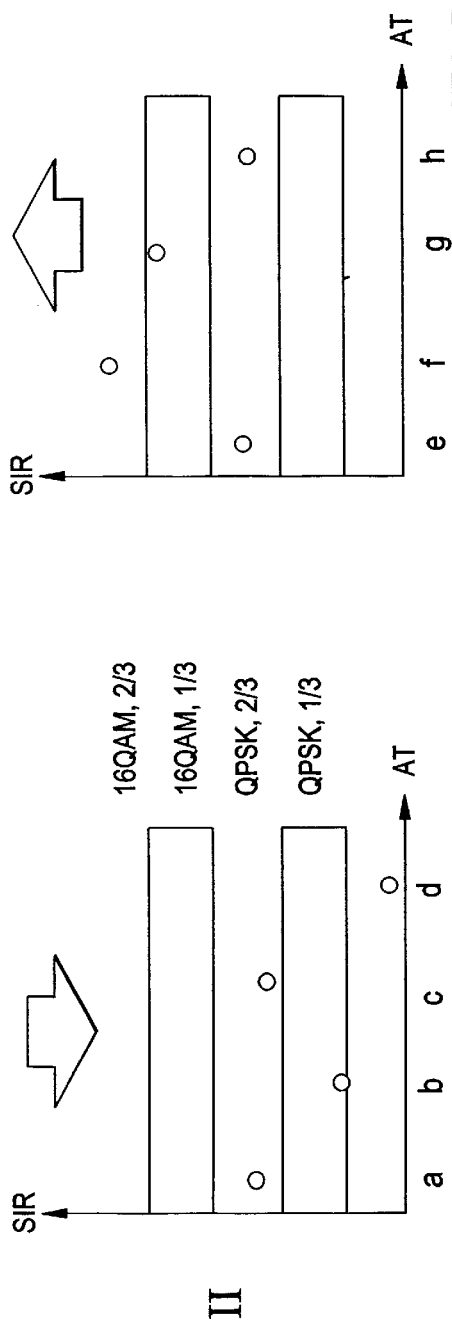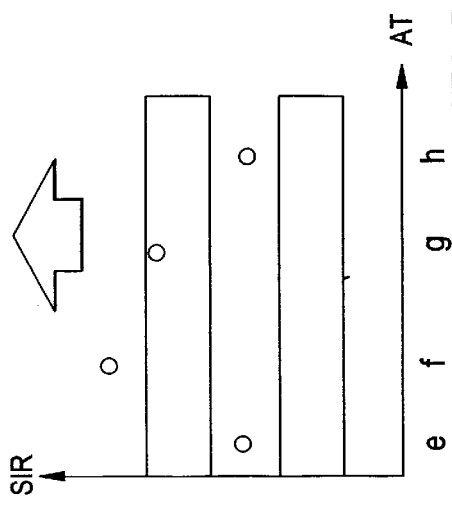

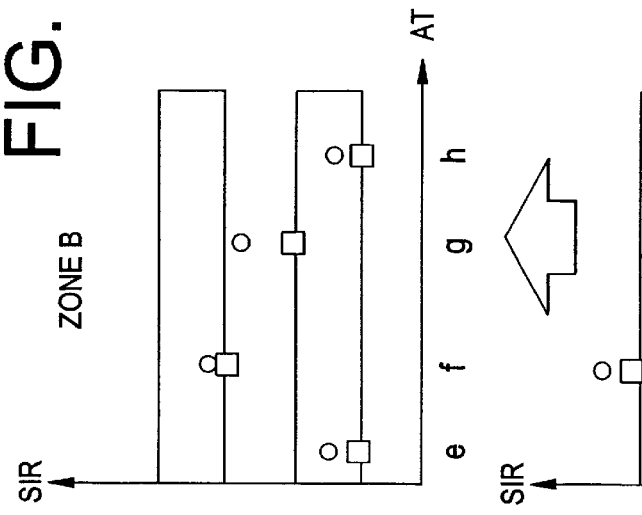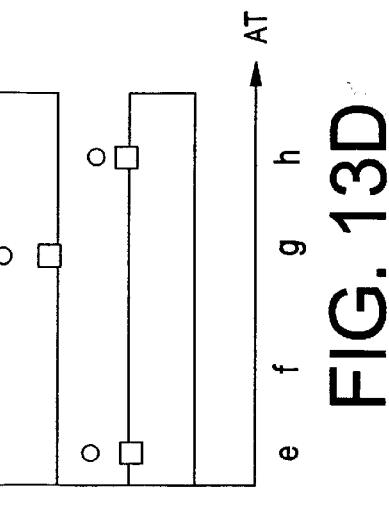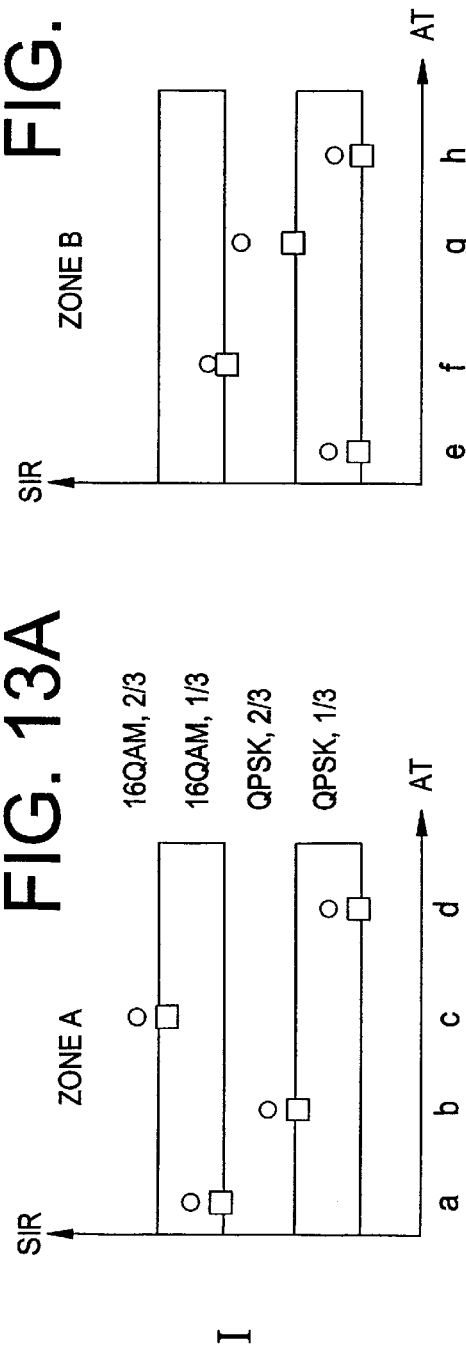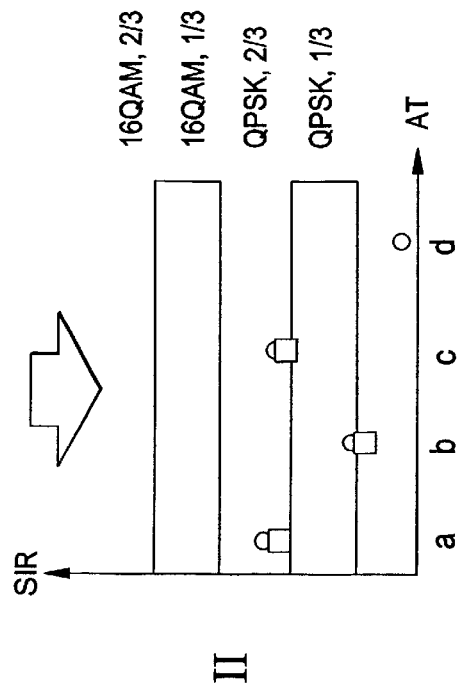

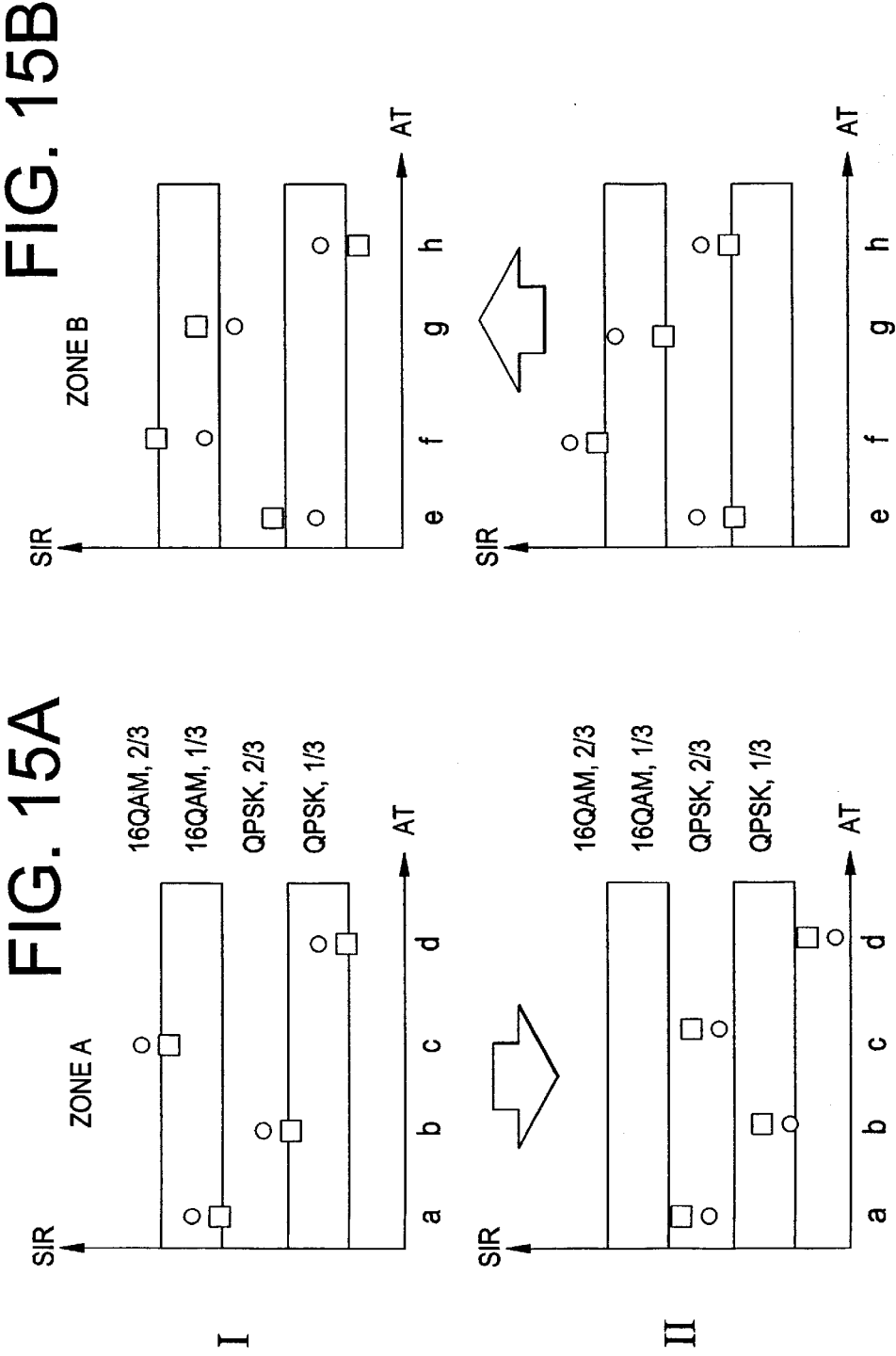

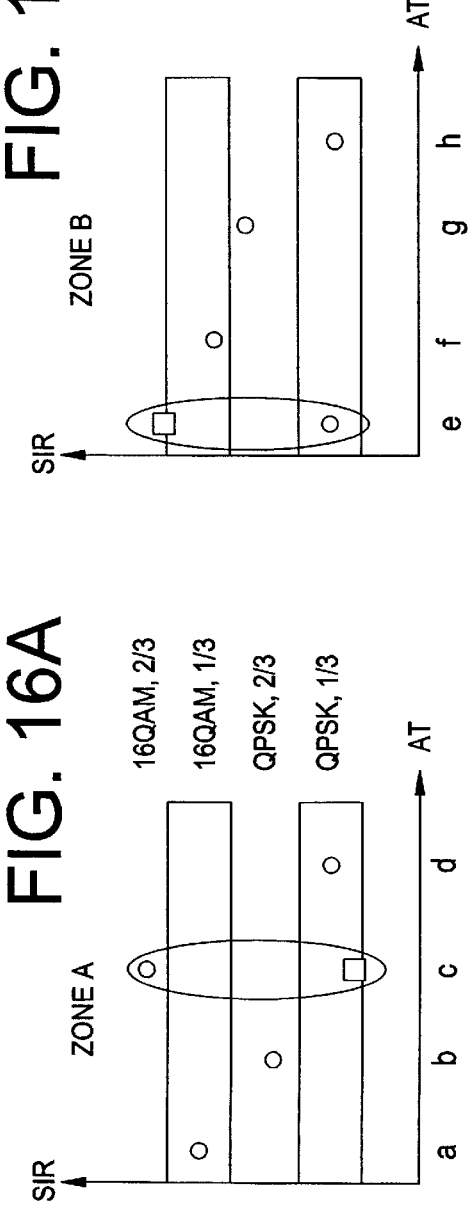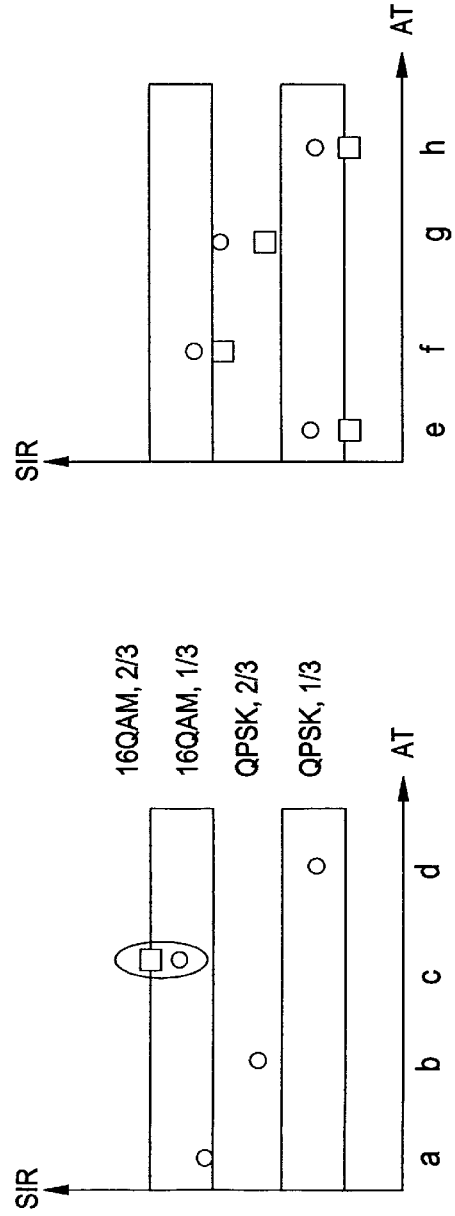

TRANSMISSION CONTROL SCHEME

RELATED APPLICATIONS

This application is related to application Ser. No. 09/826,671 entitled "SLOT ASSIGNMENT ALGORITHM", naming as inventor Akira Shibutani, filed on Apr. 5, 20001, the entire specification of which is incorporated herein by reference for all purposes as if fully set forth herein.

BACKGROUND OF THE INVENTION

This invention relates generally to the field of wireless digital communication systems and, more particularly, to wireless digital communication systems that implement adaptive modulation and coding scheme and power control scheme.

Wireless communication systems, such as cellular, use a wireless link comprised of a modulated radio frequency (RF) signal to transmit data between senders and receivers. Since RF bandwidth is a scarce resource, various signal processing techniques have been developed for increasing efficiency of the usage of the available RF bandwidth. An example of such signal processing techniques is the IS-95 promulgated by the telecommunication industry association (TIA). The IS-95 standard, used primarily within cellular telecommunications systems, incorporates code division multiple access (CDMA) to carry out multiple communications simultaneously over the same bandwidth. Under the IS-95 standard, data may be transmitted over a RF link at a maximum data rate of 9.6 or 14.4 kbps for voice codec, or up to 64 kbps for packet data communication, depending on which rate set from a set of data rates is selected. Such data rates as specified by IS-95 may be suited for wireless cellular telephone systems if the typical communication involves the transmission of digitized voice or lower rate digital data such a facsimile.

The International Telecommunication Union (ITU) of the Internet Society, the recognized authority for worldwide data network standards, has recently published its International Mobile Telecommunications-2000 (IMT-2000) standard. The standard proposes so-called third generation (3G) and beyond (i.e., 3.5G, 4G etc.) data networks that include extensive mobile access by wireless, mobile nodes including cellular phones, personal digital assistants (PDAs), handheld computers, and the like. (See http://www.itu.int). The IMT-2000 standard adopts wideband direct sequence code division multiple access (W-CDMA) as a wireless access method for the proposed third generation and beyond networks and requires a maximum data rate of 144 kbps (vehicular), 384 kbps (pedestrian) or 2 Mbps (quasi-stational), depending on the environment in which wireless communication is carried out. Thus, in communication networks according to the IMT-2000 standard, communication services that require high data transmission rates, such as the multimedia communication service, are indeed feasible over RF links.

The recent phenomenal growth of Information Technology and the Internet creates a need for a high performance wireless Internet technology and has in fact promoted development of various data transmission technologies for wireless data services. One such technology is the adaptive data rate scheme in which a data rate is adaptively changed according to the receiver's RF channel condition. One of the key requirements for wireless Internet is to maximize the data throughput in a given cell or sector. The adaptive data rate scheme optimizes data throughput on average by serving multiple data receivers at maximum data rates that the receivers can accept, given their RF channel conditions. Thus, under the adaptive data rate scheme, receivers with good channel conditions receive data at higher data rates, and receivers with poor channel conditions receive data at lower data rates.

The adaptive data rate scheme is a unique technology in many aspects. Recognizing the characteristics peculiar to data services, such as traffic asymmetry and high tolerance to latency, the adaptive data rate scheme decouples data service from voice service. Two-way conversational speech requires strict adherence to symmetry on the downlink (forward link) and uplink (reverse link) traffic and is very delay sensitive. For instance, latencies above 100 ms are intolerable and make speech unintelligible. It is also true that a relatively modest data rate is sufficient for high quality voice service. On the other hand, data services are, depending upon an application implemented, generally characterized by heavy downlink traffic and light uplink traffic and have high tolerance to latency. For high-speed data down-linked at 1 Mbps, for example, 100 ms represents just 100 kb or 12.5 kbytes, and even latencies of a couple of seconds are hardly noticeable. The decoupling of voice and data services reduces design complexities of Physical Layer because the Layer is relieved from difficult system load-balancing tasks, such as one for determining whether voice or data calls have higher priority.

The adaptive data rate scheme is usually implemented with time division multiple access (TDMA) scheme in order to serve multiple receivers simultaneously at different data rates. TDMA scheme subdivides the available frequency band into one or several RF channels called "frames." The frames are further divided into a number of physical channels called "time slots." The adaptive data rate scheme takes advantage of the characteristic of the TDMA channel that data rate control is possible on each slot. The adaptive data rate scheme may be implemented with code division multiple access (CDMA) schemes such as the time-slotted CDMA scheme.

Implementation of the adaptive data rate scheme requires measurement of a RF channel condition and determination of a maximum data rate feasible under the RF channel condition. For this and other useful purposes, at least one pilot burst is inserted into each time slot. Upon reception of the first pilot burst in each time slot, a receiver estimates its downlink channel condition and computes a maximum data rate that the estimated channel condition can support at a given level of error performance. The receiver then reports the calculated data rate to the sender. In order to transmit data to the receiver at the reported data rate, the sender selects a modulation scheme and a coding rate that can achieve data transmission at the reported data rate.

When there are multiple receivers requesting data simultaneously, the sender needs to have a scheduling functionality (a scheduler) that determines the order in which the receivers are served. Various scheduling algorithms have been proposed and used. Basically, these conventional algorithms try to achieve the same goal, i.e., optimizing the overall data throughput. To achieve the goal, these algorithms are designed to serve receivers with good channel conditions favorably to those with poor channel conditions. Thus, under the typical conventional scheduling algorithm, receivers with good channel condition are served first, and receivers with poor channel condition are served later. FIG. 1 shows a simplified graphical representation showing implementation of the adaptive data rate scheme. In FIG. 1, an access point (AP) has three sets of data ready to be transmitted to three access terminals (AT) 1, 2 and 3, respectively. The ATs (1–3) have already estimated their downlink channel conditions based on the received pilot bursts sent from the AP and returned to the AP data rates that they can accept. Suppose that the AT (1) has the best channel condition among them, the AT (2) has the next best condition and the AT (3) is the last. Accordingly, the AT (1) is requesting the highest data rate among them, the AT (2) is requesting a lower data rate and the AT (3) is requesting the lowest data rate. According to the above conventional scheduling algorithm, the AT (1) is served first, the AT (2) is next, and the AT (3) is last as shown in FIG. 1.

Another feature of the adaptive data rate scheme is that ATs transmit data at the maximum power level. The higher the transmission power level is, the better the channel condition will be. For instance, a signal to interference ratio (SIR) is one of the parameters indicative of channel condition. If a signal is transmitted at a higher power level, the SIR will improve or become higher because signal "S" becomes larger in the ratio. If the SIR becomes larger, the signal may be transmitted at a higher data rate. Thus, transmitting data at the maximum power level serves the very purpose of the adaptive data rate scheme. On the other hand, however, a signal to one AT is at the same time interference to other ATs being receiving signals from other APs. Thus, one AP transmitting data to one of its ATs at the maximum power level will improve the SIR of the AT but deteriorate the SIRs of other ATs receiving data from other APs.

FIG. 2 is a simplified graphical representation showing geometrical relationship between two access points and four access terminals. An AP 1a forms a virtual communication zone ("zone") A. An AP 1b forms its zone B. Each of the zones A and B represents an area within which it is feasible at a given level of error performance for ATs to communicate with the AP in the zone. The size of zone changes according to a change in transmission parameters, such as transmission power. If transmission power becomes high, the zone becomes larger. If transmission power becomes low, the zone becomes small. Although not shown, around the APs 1a and 1b, other APs exist and form their own zones. Also, four ATs 10a, 10b, 10c and 10d are located within the zones A and B. The AP 1a is serving the ATs 10a and 10c. The AP 1b is serving the ATs 10b and 10d. The ATs 10a and 10b are located near the fringes of the zones A and B and nearly equidistant from the APs 1a and 1b. The signal transmission from the AP 1a to the AT 10a manifests itself as interference to the signal reception by the AT 10b. Likewise, the signal transmission from the AP 1b to the AT 10b manifests itself as interference to the signal reception by the AT 10a. For the ATs 10a and 10b, because of their relative positions with the APs 10a and 10b, the signal level and the interference level are nearly equal, and thus the SIRs of the ATs 10a and 10b are low. As discussed above, under the typical conventional scheduling algorithm for the adaptive data rate scheme, ATs with good channel conditions are served first, and those with poor channel conditions are served later. Accordingly, the ATs 10a and 10b receive data less frequently or may never be able to receive data at worst until they change their relative positions with the APs 1a and 1b.

BRIEF SUMMARY OF THE INVENTION

The present invention provides a transmission control scheme for wireless digital networks comprised of a plurality of access points each communicating with access terminals, which improves data throughput to access terminals located in areas where interference from the neighboring access points are high. Generally, under the transmission control scheme according to the present invention, the access points are controlled so that neighboring access points will not transmit signals simultaneously with transmission parameters providing high robustness. The transmission parameters include, for instance, transmission power, a modulation scheme and a coding rate. Higher power transmission achieves higher robustness. Transmission at a lower modulation level achieves higher robustness. Transmission at a lower coding rate achieves higher robustness. Transmission providing high or low robustness will expand or narrow a virtual communication zone, which is defined in this application as an area within which it is feasible at a given level of error performance for access terminals to communicate with the access point in the zone. The access points may change their transmission parameters according to predetermined schedules, such as at regular intervals.

In one arrangement of the present invention, the access points are divided into a plurality of groups, and each group of access points performs data transmission achieving a different degree of robustness.

In another arrangement, the access points request permission to make a data transmission providing high robustness, and only the access points whose requests are granted may make such a transmission. The access points may pass at least one permission around themselves so that only the access point with the permission may make a transmission with high robustness. Alternatively, a request is granted with priority to an access point that has large data to be transmitted and/or to an access point that has a large number of access terminals to serve.

Transmission power control is one of the preferred embodiments of the transmission control scheme according to the present invention. In the adaptive data rate scheme, data rates are determined based on the measured channel conditions. The determined data rate should be calibrated in view of a power level at which the data is to be transmitted. After the data rate is determined, a power level at which the data is to be transmitted may be lowered within a range that supports the data rate. In response to the lowering of the power level by the access point, neighboring access points may calibrate their determined data rates in view of an expected decrease in interference due to the lowering of the power levels by the access point.

Alternatively, After the data rate is determined, a power level at which the data is to be transmitted may be raised to increase the data rate. In response to the raising of the power level by the access point, neighboring access points may calibrate their determined data rates in view of an expected increase in interference due to the raising of the power levels by the access point.

The determined data rate may be revised based on a length of data to be transmitted. A power level at which the data is to be transmitted is also revised to a level that supports at most the revised data rate. In response to the revision of the power level by the access point, neighboring access points may calibrate their determined data rates in view of an expected change in interference due to the revision of the power level by the access point.

Under the transmission control scheme according to the present invention, it is possible that multiple neighboring access points transmit data to at least one common access terminal.

BRIEF DESCRIPTION OF SEVERAL VIEWS OF THE DRAWINGS

FIG. 4 is a block diagram showing the constitutions of an access point and an access terminal;

FIG. 5 is a simplified graphical representation showing a frame and slots on a TDMA channel;

FIGS. 10A–10D are graphs showing estimate SIRs of access terminals calibrated in view of another embodiment of the present invention;

FIGS. 13A–13D are graphs showing estimate SIRs of access terminals calibrated and recalibrated according to the embodiment in FIG. 12;

FIGS. 15A–15D are graphs showing estimate SIRs of access terminals calibrated and recalibrated according to the embodiment in FIG. 14;

FIGS. 16A–16B are graphs showing estimate SIRs of access terminals calibrated and recalibrated according to another embodiment of the present invention;

FIGS. 17A–17B are graphs showing estimated SIRs of access terminals calibrated and recalibrated according to another embodiment of the present invention;

DETAILED DESCRIPTION OF THE INVENTION

The presently preferred embodiments of the invention are described herein with reference to the attached drawings, wherein like components are identified with the same references. The descriptions of the preferred embodiments contained herein are intended to be exemplary in nature and are not intended to limit the scope of the invention.

Figure 3:
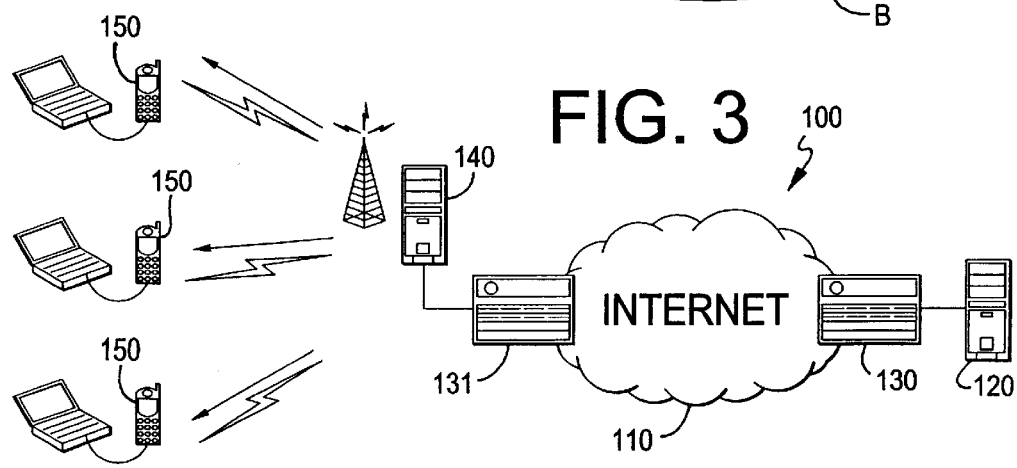
FIG. 3 is a simplified graphical representation showing a data communication network to which the present invention finds its application.

FIG. 3 illustrates an exemplary third generation, wireless, mobile access, IP network 100 in which the invention is intended to find application. The network 100 includes the Internet 110. A server 120 is connected through a router 130 to the Internet. A base transceiver station (BTS) or access point (AP) 140 is also connected to the Internet through a router 131. The AP 140 is serving multiple access terminals (AT) 150. In this application, each of the ATs 150 accesses the server 120 to receive requested data therefrom through a communication path comprised of the router 130, the Internet 110, the router 131 and the AP 140. The ATs 150 and the AP 140 communicate with each other wirelessly, using TDMA, CDMA, W-CDMA or another known wireless digital data communication technology. The implementation of TDMA CDMA, W-CDMA or other wireless digital data communication technologies is standard. Detailed descriptions thereof are not necessary to a complete understanding and appreciation of the present invention and are therefore omitted. Needless to say, other than the server 120, the routers 130 and 131, and the AP 140, there are a countless number of servers, routers and APs connected to the Internet 110, which are not shown in FIG. 3.

The network 100 supports the Internet addressing and routing protocols. According to these Internet protocols, each of the ATs, APs, servers and routers in the network has a unique address, called the IP address. To communicate digital data over the network, a sender or source node subdivides the data to be transmitted into "IP packets." An IP packet includes communication control data, such as the IP addresses of the source node and the intended destination node, and other information specified by the protocol, and substantive data to be passed on to the destination node. A single communication of data may require multiple packets to be created and transmitted depending on the amount of data being communicated and other factors. The source node transmits each IP packet separately, and the packets are routed via intermediary routers in the network from the source node to the destination node. The packets do not necessarily travel to the destination node via the same route, nor do they necessarily arrive at the same time. This is accounted for by providing each packet with a sequence indicator as part of the packetizing process. The sequence indicators permit the destination node to reconstruct the packets in their original order even if they arrive in a different order and at different times, thus allowing the original data to be reconstructed from the packets.

For purposes of the present description, it is assumed that the data network 100 adheres to the IMT-2000 standards and specifications of the ITU for wireless, mobile access networks. The proposed third generation and beyond networks support IP based data communication, i.e., all data is communicated in digital form in IP packets via the Internet addressing and routing protocols from end to end. Also, in the proposed third generation and beyond wireless networks, ATs are free to move within the network while remaining connected to the network and engaging in data communications with servers through the Internet. To support mobility of the ATs 150, the data network 100 implements Mobile IP according to the Mobile standards, such as Mobile IP Version 4 (IPv4) and Mobile IP Version 6 (IPv6), proposed by the Internet Engineering Task Force (IETF).

FIG. 4 is a block diagram showing the constructions of the AP 140 and the AT 150. The AP 140 receives data in packets from the Internet and stores it in a data buffer 141. The data buffer 141 may store multiple sets of data simultaneously for multiple ATs 150 that have requested the data. These sets of data are selectively supplied to an encoder 142 under instructions from an AP controller 143. The encoder 142 executes error-correction coding on the data supplied from the data buffer 141. In this embodiment, the error-correction coding scheme used by the channel coder 141 is Turbo coding (Parallel concatenated Convolutional coding). It should however be appreciated that other Convolutional coding schemes such as Serial concatenated Convolutional coding may also be used, or other error-correction coding schemes, such as Block coding, may be used. Convolutional codes are usually described using two parameters, a coding rate (R) and a constraint length (K). The coding rate (R) is expressed as a ratio of the length of data input into the encoder to the length of the coded data output from the encoder in a given encoding cycle. The constraint length (K) denotes the length of the Convolutional encoder, i.e., how many k-bit states are available to feed the combinatorial logic that produces the output symbol.

The purpose of Convolutional coding is to improve the quality of transmission by adding some carefully designed redundant information to the data being transmitted through the channel. Thus, the lower the coding rate (R) becomes, i.e., the more redundant information is added to the data, the more robust the coded data becomes during its transmission against interference, channel fading and other disturbances that cause transmission errors. Please note that the more redundant information is added, i.e., the lower the coding rate becomes, the lower the data rate becomes. Thus, the higher the coding rate becomes, the higher the data rate becomes but the less robust the coded data becomes against transmission errors. In this embodiment, the encoder 142 executes Turbo coding at a coding rate of either 1/3 or 2/3. It should be noted that these coding rates are exemplary and that Turbo coding may be executed at any other rates. Also, in this embodiment, the constraint length (K) is four (4), but, needless to say, it may be any other numbers.

The coded data is then supplied to a multi-level modulator 144 for modulation. The multi-level modulator selectively uses one of the three modulation levels, QPSK (Quadrature Phase Shift Keying), 8PSK (Phase Shift Keying) and 16QAM (Quadrature Amplitude Modulation) to modulate the coded data from the encoder 142. 16QAM is the highest modulation level among the three, and QPSK is the lowest modulation level, respectively. Theoretically, if a signal energy to noise ratio (E/N) is sufficiently high, 8PSK has a spectral efficiency which is 1.5 times higher than that of QPSK, and 16QAM has a spectral efficiency which is two times higher than that of QPSK. But with respect to the BER (Bit Error Rate) performance, the order is reversed. 16QAM is least robust against transmission errors and QPSK is most robust among the three. In fact, to maintain the same BER, 16QAM needs a minimum E/N which is at least 2 dB higher than that needed by QPSK, and 8PSK needs a minimum E/N which is at least 1 dB higher than that of QPSK. Thus, the higher the modulation level becomes, higher the bit rate becomes but the less robust the modulated data becomes against transmission errors.

With different combinations of the different coding rates and the different modulation levels, various data rates can be achieved. The following Table 1 shows these combinations and the corresponding data rates. Please note that the maximum data rates as shown in Table 1 are those that can be achieved with the use of one of the MAC (Medium Access Control) channels as a data channel.

TABLE 1

| Modulation Schemes | Coding Rates | Maximum Data Rates |
| --- | --- | --- |
| QPSK | 1/3 | 689.4 kbps |
| 8PSK | 1/3 | 1033 kbps |
| QPSK | 2/3 | 1378 kbps |

TABLE 1-continued

| Modulation Schemes | Coding Rates | Maximum Data Rates |
| --- | --- | --- |
| 16QAM | 1/3 | 1378 kbps |
| 8PSK | 2/3 | 2070 kbps |
| 16QAM | 2/3 | 2761 kbps |

The modulated data then undergoes interleaving at an interleaver 145 and puncturing at a puncturer 146 and is supplied to a multiplexer (MUX) where it is time-multiplexed with pilot symbols. The data time-multiplexed with the pilot symbols is supplied to a transmitter 148 and is transmitted wirelessly to ATs. The constructions, arrangements and functionalities of the interleaver 145, the puncturer 146, the MUX 147 and the transmitter 148 are conventional and standard. Detailed descriptions thereof are not necessary to a complete understanding and appreciation of the present invention and are therefore omitted. Also, the downlink channels are in fact a bundle of channels that usually include a traffic channel for data transmission, a pilot channel for pilot symbol transmission and a control channel for transmission of control information.

The transmitter 148 uses the time division multiple access (TDMA) scheme as its main communication access scheme. In the time domain, a TDMA channel is partitioned into a sequence of frames each consisting of a plurality of time slots. One TDMA channel can be time-shared by multiple ATs which are assigned to given time slots. Under the TDMA scheme, it is possible to transmit data at a different data rate in each time slot. FIG. 5 is a graphical representation of the downlink channel used by the transmitter 148 and shows one of the TDMA frames of the channel used in the embodiment. As shown in FIG. 5, one frame consists of a plurality of time slots each having a length of 0.667 ms and two pilot symbols inserted therein. When there is no data to be sent on the traffic channel, the only transmissions from the AP 140 are those of the pilot symbols on the plot channel and periodic transmissions of control information on other control channels.

According to the present invention, the AP controller 143 controls the transmission power of the transmitter 148 transmitting data on the traffic channel. In this embodiment, control of the transmission power may be possible at 256 different levels. Also, in the embodiment, control of the transmission power on the traffic channel is possible at each slot. Thus, under the instructions from the AP controller 134, the transmitter can transmit data on the traffic channel at any one of the 256 power levels at each slot. The pilot symbols transmitted on the pilot channel are made reference signals for ATs to estimate their traffic channel conditions and always transmitted at a constant level.

In an AT 150, on the other hand, the data and the pilot symbols are received by a receiver 151 and supplied to a de-multiplexer 152 where the data and the pilot symbols are separated. The data is then processed back into the original form through an un-puncturer 153, a de-interleaver 154, a demodulator 155 and a decoder 156, using the coding rate and the modulation scheme reported from the AP 140. The constructions, arrangements and functionalities of the un-puncturer 153, the de-interleaver 154, the demodulator 155 and the decoder 156 are conventional and standard. Detailed descriptions thereof are not necessary to a complete understanding and appreciation of the present invention and are therefore omitted.

The pilot symbols are supplied to a channel condition detector 157. When receiving the first of the two pilot symbols in each time slot, the channel condition detector 157 estimates the condition of the downlink traffic channel based on the pilot symbol received on the pilot channel and provides the channel condition information to an AT controller 158. In this embodiment, the channel condition information includes a signal to noise ratio (SIR). Those skilled in the art will appreciate that other channel condition parameters, such as signal to a noise ratio (SNR), a signal to noise and interference ratio (SNIR) and a signal energy to noise ratio (E/N), may be used in place of an SIR. Alternatively, an error rate, such as a frame error rate (FER) or a bit error rate (BER), may be used as channel condition information. The AT controller 158 forwards the channel condition information to a transmitter 159, which transmits the information wirelessly over an uplink channel to the AP 140 at every slot timing. In the AP 140, the channel condition information is received by a receiver 149 and supplied to the AP controller 143. The AP controller 143 converts the received channel condition information into a data rate. The data rate obtained is a maximum data rate at which the downlink traffic channel can transmit data at a given level of error performance. For instance, the AP controller 143 may have a conversion table stored therein, such as Table 2 shown below. Table 2 shows ranges of SIRs, the corresponding maximum data rates and the combinations of coding rates and modulation levels that achieve the corresponding data rates. Table 2 is prepared through experiments conducted to determine relationships between SIRs and maximum data rates feasible under the SIRs at a given level of error performance. With the channel condition information reported from an AT, the AP controller 143 looks up Table 2 and determines a maximum data rate for the AT, and a combination of coding rate and modulation level that achieves the data rate.

TABLE 2

| SIR (dB) | Maximum Data Rates | Modulation Schemes | Coding Rates | DRC |
|---|---|---|---|---|
| −7 | 689.4 kbps | QPSK | 1/3 | 1 |
| 7–11 | 1033 kbps | 8PSK | 1/3 | 2 |
| 11–14 | 1378 kbps | QPSK | 2/3 | 3 |
| 14–16 | 1378 kbps | 16QAM | 1/3 | 4 |
| 16–18 | 2070 kbps | 8PSK | 2/3 | 5 |
| 18– | 2761 kbps | 16QAM | 2/3 | 6 |

Alternatively, the AT controller 158 in an AT 150 may have Table 2 to determine the data rate for itself. The maximum data rates may be represented by data rate control (DRC) numbers as shown in Table 2. There are six DRC numbers from 1 though 6 each corresponding to one data rate. Thus, looking up Table 2, the AT controller 158 can determine the data rate and sends the corresponding DRC number to the AP. The use of the DRC numbers may increase computational overhead on ATs 150 but will significantly reduce communication overhead, compared to sending raw channel condition information, such as an SIR. Please note that the block diagram as shown in FIG. 4 is drawn, focusing on downlink data transmission. The AP 140 and the AT 150 are, of course, capable of uplink data transmission. In fact, the AP 140 has a decoder, a demodulator and other functionalities, such as those shown in the AT 150, for reconstructing received data. Likewise, the AT 150 has an encoder, a modulator and other functionalities, such as those shown in the AP 150 for processing data for transmission. But detailed descriptions thereof are not necessary to a complete understanding and appreciation of the present invention and therefore omitted from FIG. 4.

A plurality of ATs 150 may request to receive data simultaneously. When the AP 140 has in the data buffer 141 multiple sets of data to be distributed to different ATs 150, scheduling for delivering data to the ATs becomes necessary. The presently preferred embodiments of the algorithm for scheduling data delivery to different ATs are described in detail in Applicant's co-pending patent application Ser. No. 09/826,671, entitled "SLOT ASSIGNMENT ALGORITHM," filed on Apr. 5, 2001, the entire specification of which is incorporated herein by reference. The co-pending application provides scheduling algorithms that guarantee minimum data transport service for even ATs with poor channel conditions. Generally, according to the scheduling algorithms in the co-pending application, data-requesting ATs are divided into a number (Ng1) of AT groups according to their channel conditions. Also, a recurring sequence of time slots is defined on the TDMA channel and partitioned into a number (Ng2) of slot groups, where Ng2 is made larger than Ng1. The transmission scheduling according the co-pending application is a two-step process. First, in each sequence, the slot groups are allocated to the AT groups so that AT groups with better channel conditions will receive more slot groups while each AT group will receive at least one slot group. Second, in each AT group, the time slots in a slot group allocated to an AT group are assigned to the individual ATs in the group.

Figure 6:
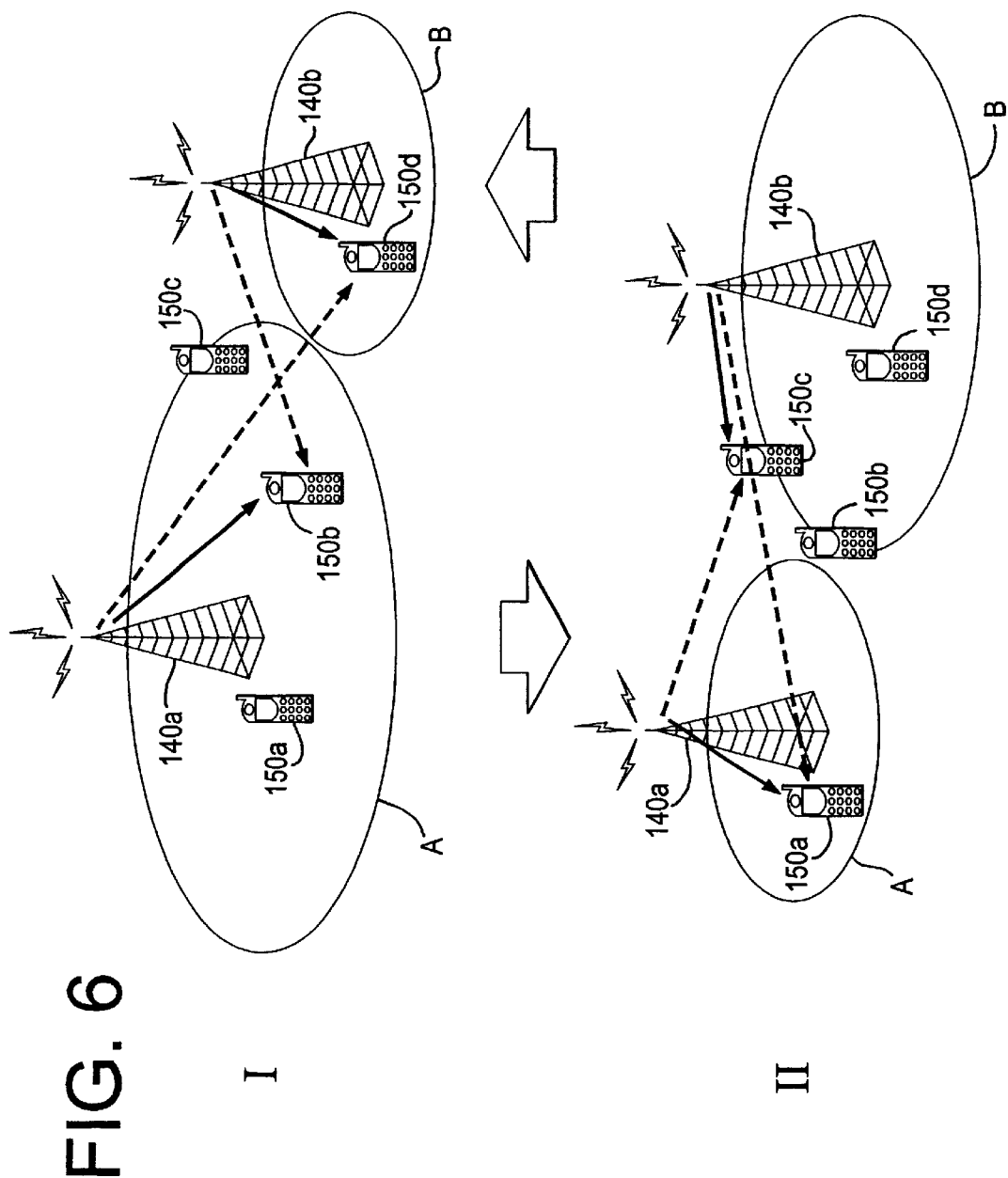
FIG. 6 is a graphical representation showing two-state transmission control according to the present invention.

Now, preferred transmission control schemes according to the present invention will be explained in detail. Basically, under the transmission control schemes according to the present invention, neighboring APs are controlled so that they will not transmit data simultaneously with transmission parameters that provide a high degree of robustness. The transmission parameters include, for instance, transmission power, a modulation level and a coding rate. The transmission parameters will be further explained with reference to FIG. 6. In FIG. 6, two neighboring APs 140a and 140b are located adjacent to each other. The ATs 140a and 140b form virtual communication zones A and B, respectively. A virtual communication zone ("zone") means, as already defined, an area within which it is feasible at a given level of error performance for ATs to communicate with the AP in the zone. There are also four ATs 150a, 150b, 150c and 150d located within the zones A and B. The ATs 150a and 150b are receiving data from the AP 140a. The ATs 150c and 150d are receiving data from the AP 140b. The ATs 150a and 150d are located close to the APs 140a and 140b, respectively. The ATs 150b and 150c are located nearly equidistant to the APs 140a and 140b.

The size of a zone is a function of transmission parameters. If data is transmitted with transmission parameters achieving high robustness, the zone will become large. If data is transmitted with transmission parameters providing low robustness, the zone will become small. For instance, transmission power is one of the parameters. A high power transmission achieves high robustness and thus expands the zone. The modulation level is also one of the parameters. As explained above, a high modulation level, such as 16QAM, achieves a high bit rate but gives rise to a low degree of robustness, thus narrowing the zone. Similarly, a high coding rate achieves a high data rate but gives rise to low robustness, thus making the zone small.

According to the embodiment illustrated in the FIG. 6, the transmission parameters of the APs 140a and 140b are changed periodically between State I shown in the upper half of the figure and State II shown in the lower half of the figure. In State I, the AP 140a will transmit data with transmission parameters providing high robustness, for instance, at a high power level, a high coding rate and/or a low modulation level. As a result, its zone A will become large. On the other hand, the AP 140b will transmit data with parameters providing low robustness, for instance, at a low power level, a high coding rate and/or a high modulation level. The resulting zone B will become small. To the contrary, in State II, the AP 140a will a data transmit with low robustness, and the AP 140b will make a data transmit with high robustness. States I and II will be switched periodically.

Figure 1:
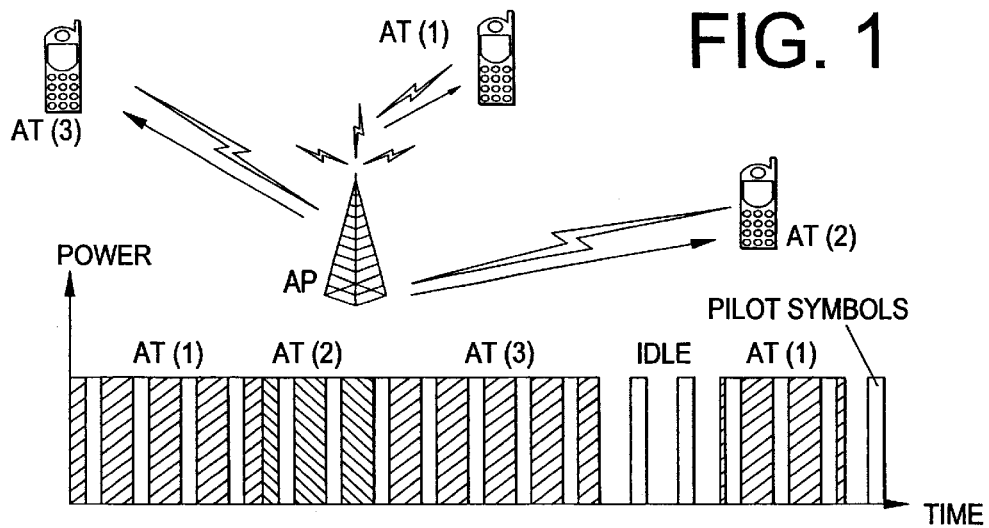
FIG. 1 is a simplified graphical representation showing assigning of slots to multiple access terminals in the adaptive data rate scheme.
Figure 2:
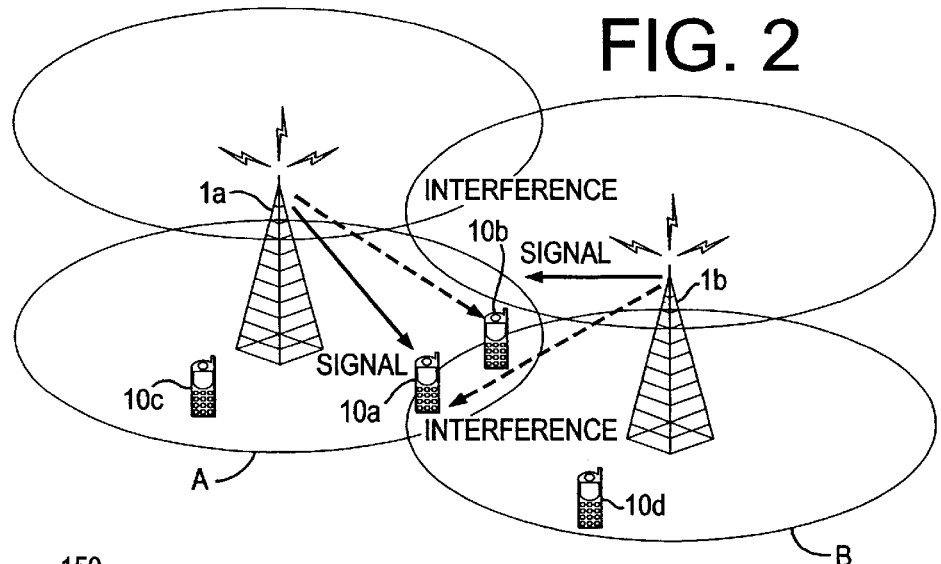
FIG. 2 is a graphical representation showing access points wirelessly communicating with access terminals and their geographical relationships.

As discussed with FIG. 2, since the ATs 150b and 150c are nearly equidistant from the APs 140a and 140b, their SIRs estimated based on received pilot symbols may be too low to justify transmission of data to them. However, according to the present invention, the transmission parameters of the APs 140a and 140b are changed between States I and II, the AP 140a can serve the AT 150a in State I. In the meantime, the AP 140b may serve the AT 150d, which is located close to the AP 140b. The AP 140b can serve the AT 150c in State I. In the meantime, the AP 140a may serve the AT 150a, which is located close to the AP 140a. For instance, suppose that the transmission powers of the APs 140a and 140b are the only transmission parameter to be changed between State I and State 11. In State I, thus, the AP 140a is conducting a high power transmission and the AP 140b is conducting a low power transmission. In State I, the AT 150b has low interference from the AP 140b because the AP 140b is transmitting data at the low power level. Although the AP 140a is transmitting data at the high power level, the AT 150d has low interference from the AP 140a because the AT 150d is distant apart from the AP 140a. For the same reason, in State II, the AP 140b can serve the AT 150c. In the meantime, the AP 140a may serve the AT 150a. Thus, by switching the power levels between States I and II periodically, the APs 140a and 140b can transmit data to the ATs 150b and 150c. In other words, the ATs 150b and 150c can receive better services from the APs 140a and 140b. The switching between States I and II must be performed in synchronism between the APs 140a and 140b. The switching may be performed in accordance with a scheduling algorithm. For instance, the switching may be performed at regular intervals of the fixed number of slots, such as every one slot, every two slots, etc.

Suppose that the modulation levels of the APs 140a and 140b are the only transmission parameter to be changed between State I and II. In State I, thus, the AP 140a is conducting a transmission at a low modulation level and the AP 140b is conducting a transmission at a high modulation level. Although the level of the interference that the AT 150b is suffering is still high, it can receive data from the AP 140a because the AP 140a is transmitting the data at the low modulation level, which makes the transmission robust against interference and other disturbances that cause transmission errors. Although the AP 140b are transmitting data at a high modulation level, the AT 150d can receive the data from the AP 140b. The AT 150d is located away from the AP 140a and thus has low interference from the AP 140a. The same is true when the coding rates of the AP 140a and 140b are the only parameter to be changed between States I and II.

In the present invention, the term "high robustness" or "low robustness" indicates a relative degree of robustness achieved between two sets of transmission parameters. Therefore, the transmission parameters of the AP 140a and 140b may be freely selected in States I and II as long as the two sets of transmission parameters selected achieve different degrees of robustness as required for the APs 140a and 140b in States I and II. For instance, as explained above, the power level can be changed at 256 levels. The APs 140a and 140b in FIG. 6 may transmit data in States I and II at any different power levels selected from the 256 levels as long as one achieves a higher degree of robustness than the other as required for the APs 140a and 140b in States I and II.

In FIG. 6, there are only two neighboring APs depicted. In reality, however, there are a plurality of neighboring APs, and the switching should be performed simultaneously on all of the neighboring APs including the APs 140a and 140b. There are many ways to perform control of the transmission parameters over a plurality of APs. One way is to circulate at least one token ring around the APs. Only the AP with a token ring is allowed to make a transmission providing high robustness. For instance, the transmission power is one of the transmission parameters. An arrangement is possible where an AP with a token ring is allowed to make a transmission at the highest level among the 250 power levels or at a level selected by the AP itself from the 250 power levels, and other APs without a token ring are limited to making transmission at levels lower than that of the AP with a token ring. Alternatively, another arrangement is possible where the 256 power levels are divided into the upper half levels (128 levels) and the lower half levels (128 levels); an AP with a token ring makes a transmission at a level selected by the AP itself from the upper half power levels; and other APs without a token ring make transmission at levels selected by themselves from the lower half power levels. If an AP that has just received a token ring does not need to make a transmission achieving high robustness, it will simply pass on the token ring to a next AP.

Figure 7:
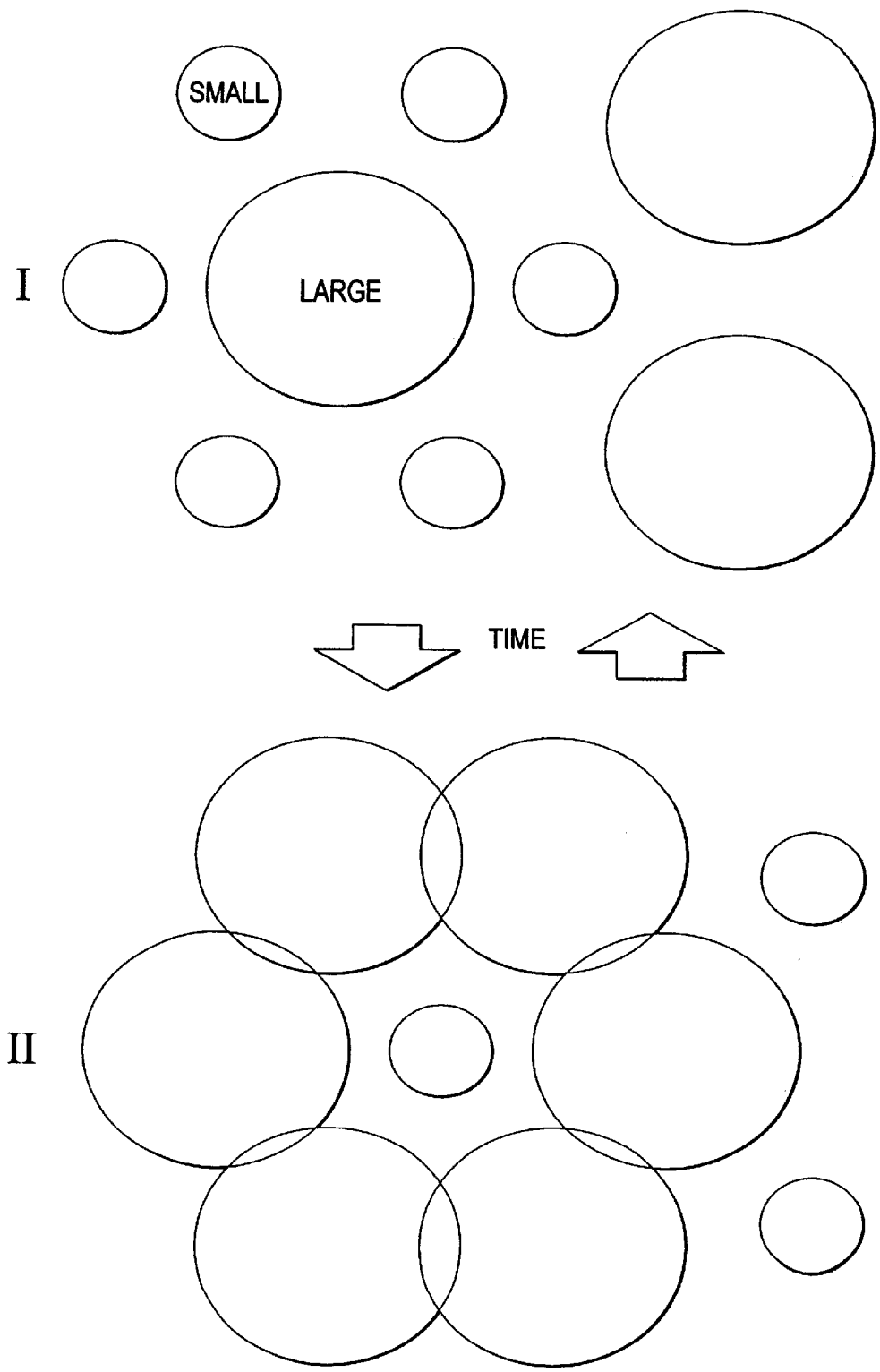
FIG. 7 is a simplified graphical representation showing two-state transmission control according to the present invention.

The control of the transmission parameters may be performed on groups of APs. FIG. 7 is a simplified graphical representation showing a plurality of neighboring APs on which the transmission control scheme according to the present invention is performed. There are nine APs in FIG. 7 each represented by a zone formed thereby. A large zone indicates that the AP in the zone is transmitting data with transmission parameters providing a high degree of robustness. A small zone indicates that the AP in the zone is transmitting data with transmission parameters providing a low degree of robustness. Two States I and II are shown in FIG. 7 which are switched periodically. As shown in FIG. 7, the APs are divided into two groups. In State I, one group of APs make a transmission with high robustness, and the other group make a transmission with low robustness. Their roles are switched in State II. The APs are grouped based, for instance, on their relative positions with the other surrounding APs. It is important that two closely situated APs should not in the same group.

Figure 8:
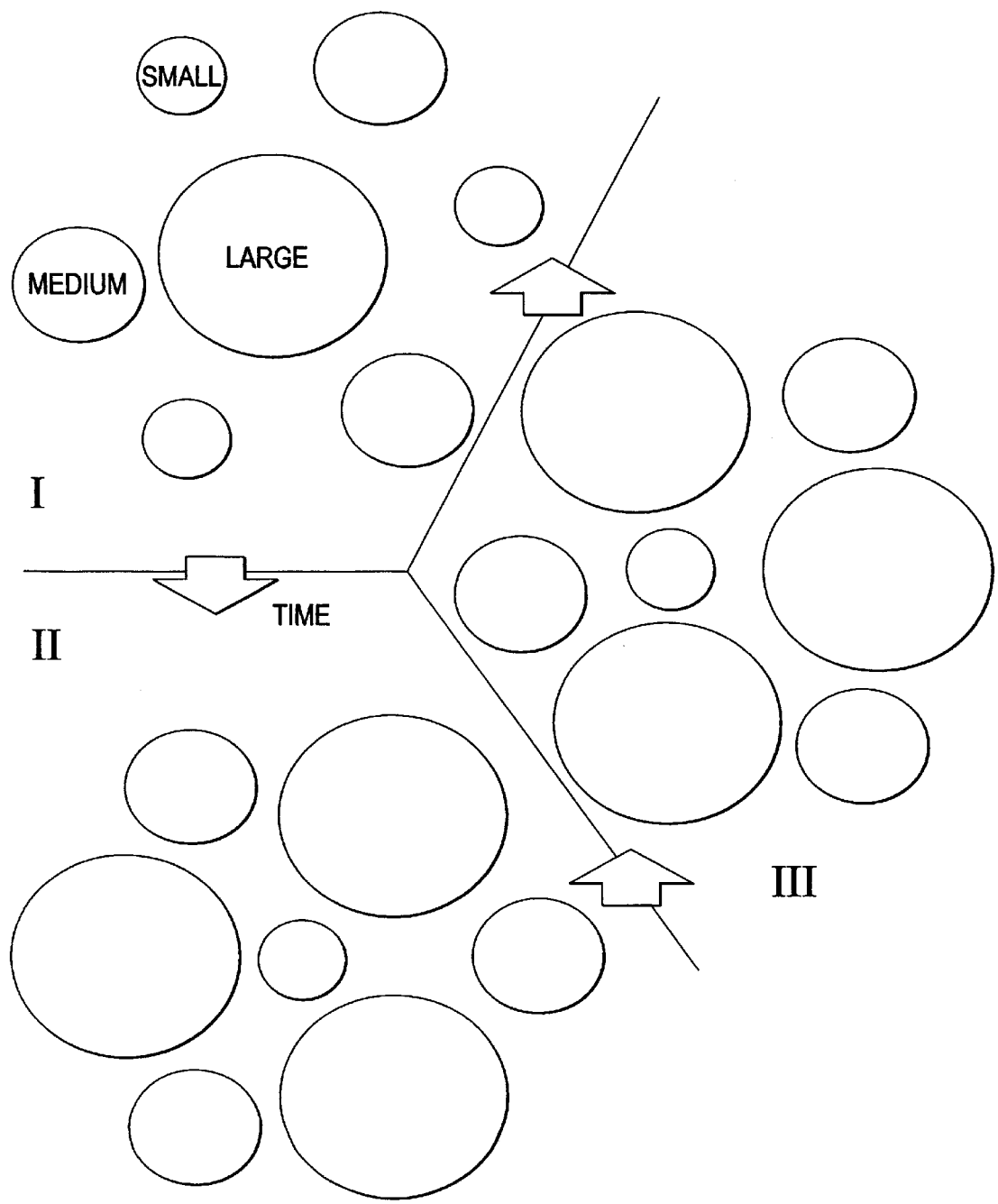
FIG. 8 is a simplified graphical representation showing three-state transmission control according to the present invention.

FIGS. 6 and 7 show switching between two States I and II. It should be noted that switching is possible over more than two States. For instance, FIG. 8 shows a three-state transmission control where the transmission parameters of the APs are changed at three levels, achieving high, medium and low degrees of robustness. In FIG. 8, each AP changes its transmission parameters counterclockwise from State I to State II to State III.

The concept of the present invention has been discussed with FIG. 6 in conjunction with the conventional problem associated with the adaptive data rate scheme that ATs located nearly equidistant from two neighboring APs receive poor data transport services from the APs. It should be appreciated that the transmission control scheme according to the present invention is not just for saving particular ATs whose channel conditions are poor due to their relative positions with neighboring APs but also for facilitating implementation of the adaptive data rate scheme. For instance, changes of the transmission parameters may be scheduled by a transmission control (TC) scheduler that can communicate with the AP. The TC scheduler may be a radio network controller (RNC) if the network supports W-CDMA or may be the IP core network located in the Internet. Under this arrangement, APs, when necessary, request the TC scheduler for permission to make a transmission with high robustness. In response, the TC scheduler makes scheduling among the requesting APs so as to facilitate their data transmissions. The simplest scheduling method is to give permission to the requesting APs in the order that they requested the permission. The TC scheduler may give permission simultaneously to multiple ATs that are not closely situated to one another. Alternatively, the TC scheduler, in conducting scheduling, may evaluate the situations of the APs and determine the priority as to how soon they should be allowed to make a transmission with high robustness. The purpose of determining the priority is to improve the overall data throughput. Considerations for determining the priority are, for instance, how large the data is that is to be transmitted and how many ATs the AP is currently serving. An AP with large data to be transmitted should receive higher priority. Likewise, an AP currently serving a large number of ATs should receive higher priority. The control of the transmission parameters may be initiated by an AT that is traveling an area where interference is high. While traveling an area where interference is high, the AT instructs the neighboring APs causing the interference to perform the transmission control according to the present invention. The AT may so instruct the RNC though the neighboring APs.

Figure 9:
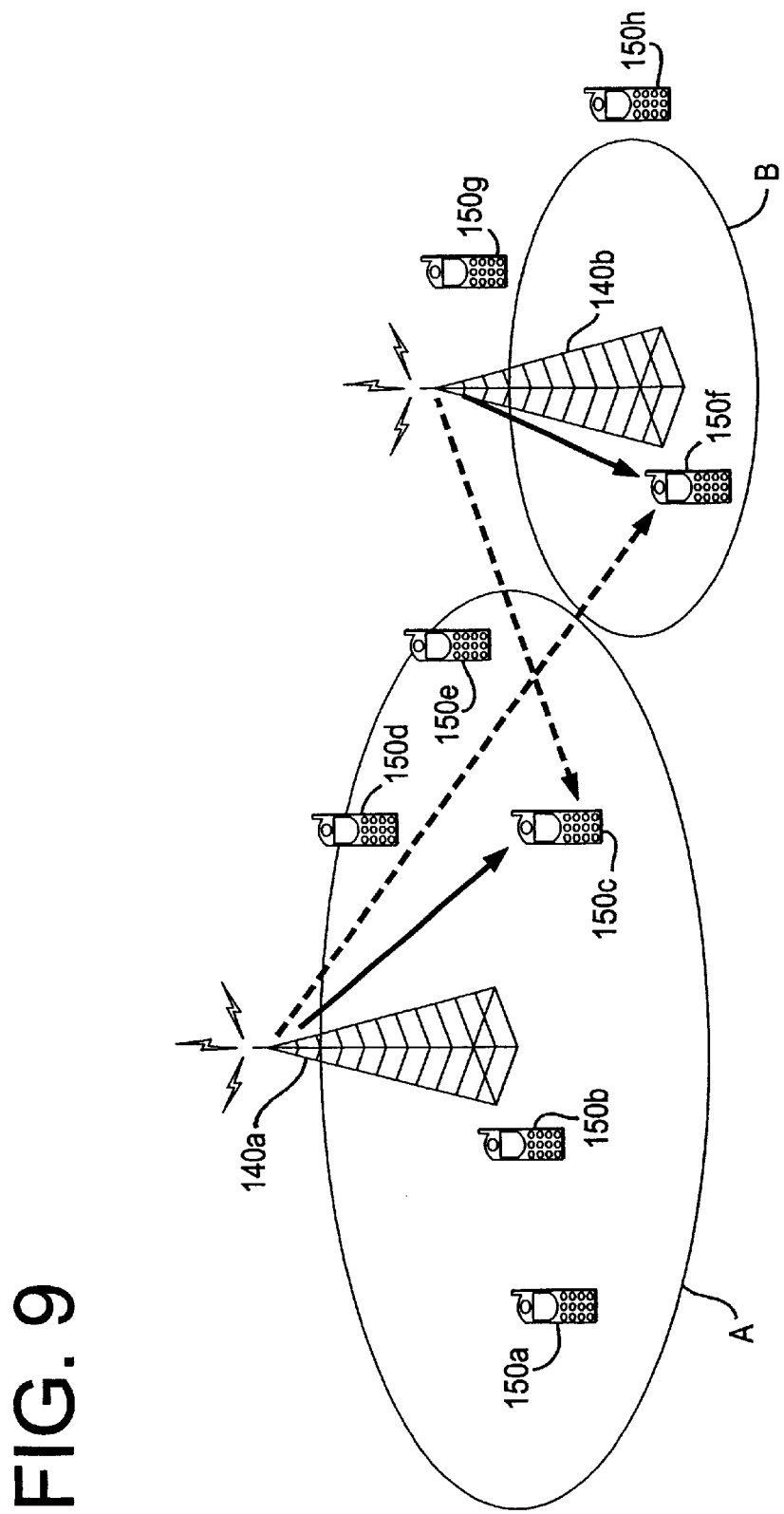
FIG. 9 is a graphical representation showing access points wirelessly communicating with access terminals and their geographical relationships whereon an embodiment of the present invention is implemented.

FIGS. 9 shows detailed operations of the transmission control scheme according to the present invention. As shown in FIG. 9, there are two neighboring APs 140a and 140b forming zones A and B, respectively. Although not shown, other neighboring APs of course exist around the APs 140a and 140b. For the convenience of describing the operations to be performed, a focus is placed on the two APs 140a and 140b. But the transmission control scheme according to the present invention is also applicable on more than two APs. Please also note that for the convenience, the embodiment will be explained, forcing on control of transmission power, which is one of the transmission parameters.

Figure 11:
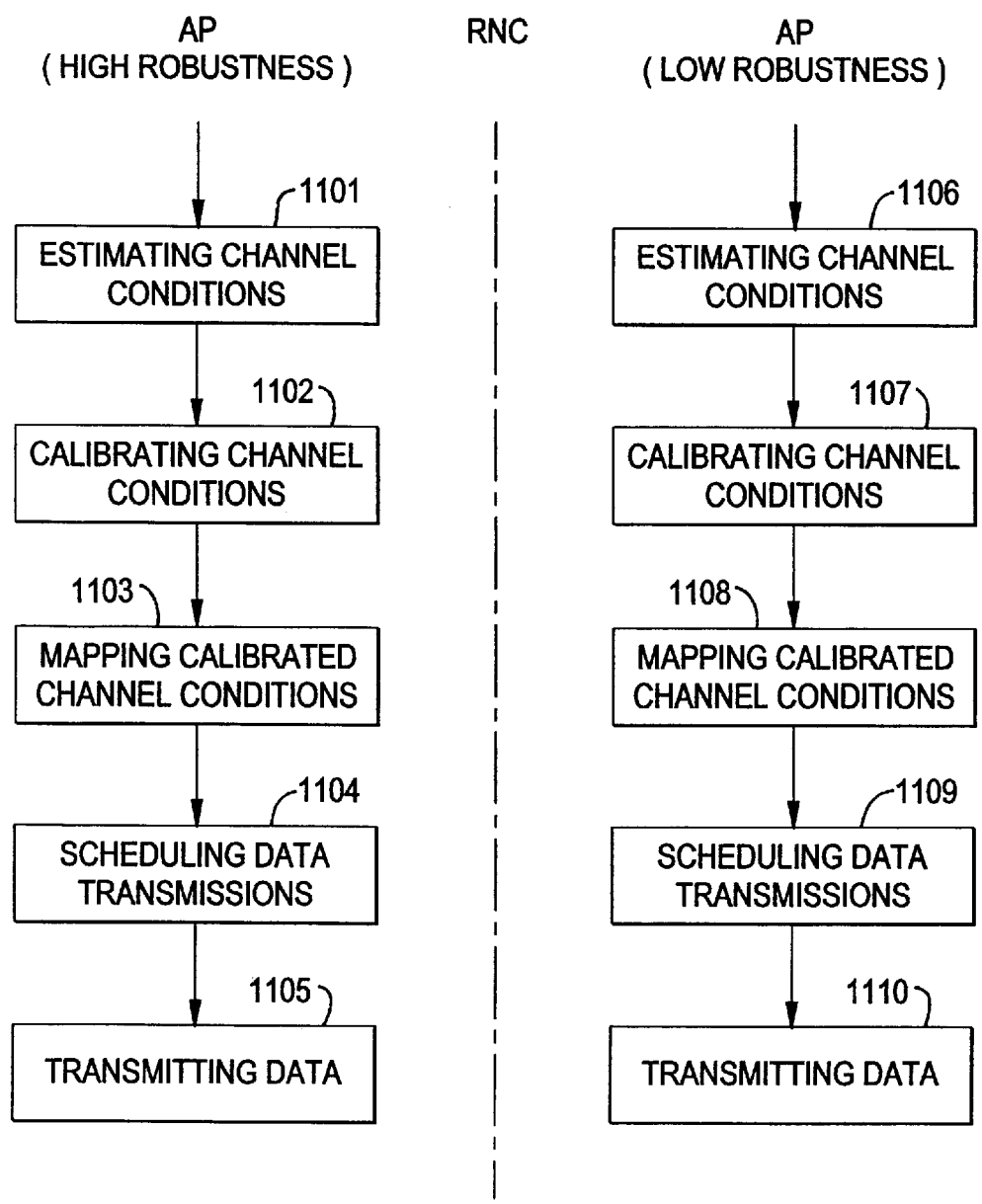
FIG. 11 is a flowchart showing the operations of another embodiment of the present invention.

Currently, there are eight ATs 150a–150h found in the zones A and B. Suppose that the eight ATs 150a–150h have requested data from the Internet and that the APs 140a and 140b have the data ready to be distributed to the ATs. There are two alternating power-control states I and II that are switched periodically. In State I, the AP 140a will transmit data at a predetermined high power level (HP level) selected from the 256 power levels, and the AP 140b will transmit data at a predetermined low power level (LP level), which is selected from the 256 power levels but lower than the HP level. In State II, their transmission power levels are switched. FIG. 11 is a flowchart showing the power control scheme performed on the APs and ATs shown in FIG. 9. The operation flow illustrated on the left hand side of the figure will be followed by an AP that is going to be transmitting data at the HP level, i.e., the AP 140a in State I or the AP 140b in State II. The operation flow illustrated on the right hand side of the figure will be followed by an AP that is going to be transmitting data at the LP level, i.e., the AP 140b in State I or the AP 140a in State II. As explained above, the APs 140a and 140b periodically send out pilot symbols at a constant power level. Upon reception of a pilot symbol, the ATs 150a–150h estimate the channel conditions of their downlink traffic channels (Steps 1101 and 1106) and send back the channel condition information to the APs 140a and/or 140b. In this embodiment, the channel condition information includes an estimated SIR (signal to interference ratio). Those skilled in the art will appreciate that in stead of an SIR, other channel condition indicators, such as a signal to noise ratio (SNR), a signal to noise and interference ratio (SNIR) and a signal energy to noise ratio (E/N), may be used for the same purpose. Alternatively, an error rate, such as a frame error rate (FER) or a bit error rate (BER), may be used as a channel condition indicator. Both noise-based channel condition indicators and error-based channel condition indicators may be used in forms quantized, using a bit sequence of any length, such as 8 bits or 16 bits.

By returning the channel condition information to the APs 140a and 140b, each AT registers itself with either or both of the APs 140a and 140b. For simplicity, it is assumed here that the ATs 150a–150d are registered with the AP 140a and that the ATs 150e–150h are registered with the AP 150b. In other words, the ATs 150a–150d are to be receiving data from the AP 140a, and the ATs 150e–150h are to be receiving data from the AP 150b. Now, the AP 140a and 140b are about to go into State I and are preparing data transmissions to their ATs for the oncoming State I. In Steps 1102 and 1107, the APs 140a and 140d calibrate the SIRs estimated by their ATs so that the SIRs will accurately reflect the power levels of the AP 140a and 140d during the oncoming State I.

Briefly returning to Steps 1101 and 1106, the ATs estimate their downlink traffic channel conditions. The estimation of a channel condition is performed based on the pilot symbols sent from the AP at a constant power level. In estimating an SIR, the AT solves a functional relationship between the measured pilot symbol and the estimated SIR at a given reference transmission power level (an SIR is a function of transmission power). Thus, the estimated SIR as such is a viable channel condition indicator only when data is to be transmitted at the reference power level. If data is to be transmitted at a power level different from the reference power level, the estimated SIR must be calibrated based on the actual transmission power with which the data is to be transmitted. How an estimated SIR should be calibrated varies based on where the reference power level is set between the HP and LP levels. The reference power level may of course be set at the HP or LP level. In this embodiment, the reference power level is set in between the HP and LP levels. Therefore, in State I, the actual SIRs of the ATs 150a–150d are expected to be better than the estimated SIRs because they will receive stronger signals from the AP 140a and lower interference from the AP 140b. On the other hand, in State I, the SIRs of the ATs 150e–150h are expected to be worse than the estimated SIRs because they will receive weaker signals from the AP 140b and higher interference from the AP 140a.

To calibrate the estimated SIRs to actual SIRs, the estimated SIRs are divided or multiplied by a coefficient $\beta$ ($0<\beta<1$) (Steps 1102 and 1107). More specifically, the AP 140a, i.e., the AP controller 143 (FIG. 4) in the AP 140a, performs the calibration by dividing by $\beta$ the estimated SIRs from the ATs 150a–150d, so that the calibrated SIRs becomes larger than those estimated. On the other hand, the AP 140b multiplies by $\beta$ the estimated SIRS from the ATs 150e–150h, so that the calibrated SIRs becomes smaller than those estimated. Please note that this calibration operation (Steps 1102 and 1107) may be performed in ATs if the ATs are informed of the transmission power schedule. The calibration operation cannot be performed in ATs if APs control their transmission power levels adaptively in response to changing circumstances.

In Steps 1103 and 1108, the APs 140a and 140b, i.e., the AP controllers 143, map the calibrated SIRs on Table 2 to find the maximum data rates feasible under the calibrated SIRs at a given level of error performance. As a result, the calibrated SIRs of the ATs 150a–150d are plotted as shown in FIG. 10A. The vertical axis of FIG. 10A represents an SIR. As shown in FIG. 10A, the calibrated SIR of the AT 150a falls within the range corresponding to the data rate of 1378 kbps (16QAM+1/3 coding rate) (see Table 2). The calibrated SIR of the AT 150b falls within the range corresponding to the data rate of 1378 kbps (QPSK+2/3 coding rate). The calibrated SIR of the AT 150c falls within the range corresponding to the data rate of 2761 kbps (16QAM+2/3 coding rate). The calibrated SIR of the AT 150d falls within the range corresponding to the data rate of 689 kbps (QPSK+1/3 coding rate). Please note that there are actually six levels of data rates as show in Table 2, but for simplicity, only four levels of data rates are shown in FIG. 10A. The calibrated SIRs of the AT 150e–150h are plotted as shown in FIG. 10B. In Steps 1104 and 1109, the APs 140a and 140b schedule data transmissions to the ATs 150a–150h, using one of the scheduling algorithms described in the co-pending application filed by the same Applicant. Lastly, the APs 140a and 140b transmit data at the HP level to an AT selected from the ATs 150a–150d according to the schedule (Step 1105). The AP 140b transmits data at the LP level to an AT selected from the ATs 150e–150h according to the schedule (Step 1110).

As discussed in the co-pending application in detail, above Steps 1101–1105 or Steps 1106–1110 are repeated in each TDMA slot. More precise timing is that the preparatory steps (Steps 1101–1104 and 1106–1109) are performed in every slot for transmission (Step 1105 and 1110) that will be performed in a next slot. On the other hand, State I and State II may last more than one slot. Thus, the AP 140a repeats the left operation flow in FIG. 11 in each slot as long as a next slot is in State I. The AP 140b repeats the right operation flow in each slot as long as a next slot is in State I. If the next slot is in State II, the AP 140a performs the right flow, and the AP 140b performs the left flow. FIGS. 10C and 10D show the SIRs calibrated for data transmission in State II. Data transmissions in State II are carried out according to the schedule made based on the calibrated SIR plotted in FIGS. 10C and 10D.

In the above embodiment, instead of switching transmission power levels between States I and II, the modulation levels may be switched while the transmission power is fixed at a constant level, such as the reference power level. Suppose that in State I, the AP 140a will transmit data at a low modulation level, i.e., QPSK, and the AP 140b will transmit data at a high modulation level, i.e., 16QAM. In such an arrangement, calibration of estimated SIRs is not necessary because the transmission power will not change. The estimated SIRs as such are plotted directly on FIGS. 10A–10D. Suppose that FIGS. 10A–10D show the estimated SIRs directly plotted. In State I, the AP 140a will transmit data, using QPSK, and the AP 140b will transmit data, using 16QAM. Therefore, during the oncoming State I, the AP 140a will transmit data to the AT 150b at the coding rate of 2/3 and/or to the AT 150d at the coding rate of 1/3. The AP 140b will transmit data to the AT 150f at the coding rate of 1/3. On the other hand, in State II, the AP 140a will transmit data, using 16QAM, and the AP 140b will transmit data, using QPSK. Therefore, during the oncoming State II, the AP 140a will transmit no data because none of the ATs 150a–150d qualifies to receive data at the modulation level of 16QAM. The AP 140b will transmit data to the AT 150f at the coding rate of 2/3 and/or to the AT 150g at the coding rate of 1/3.

Figure 12:
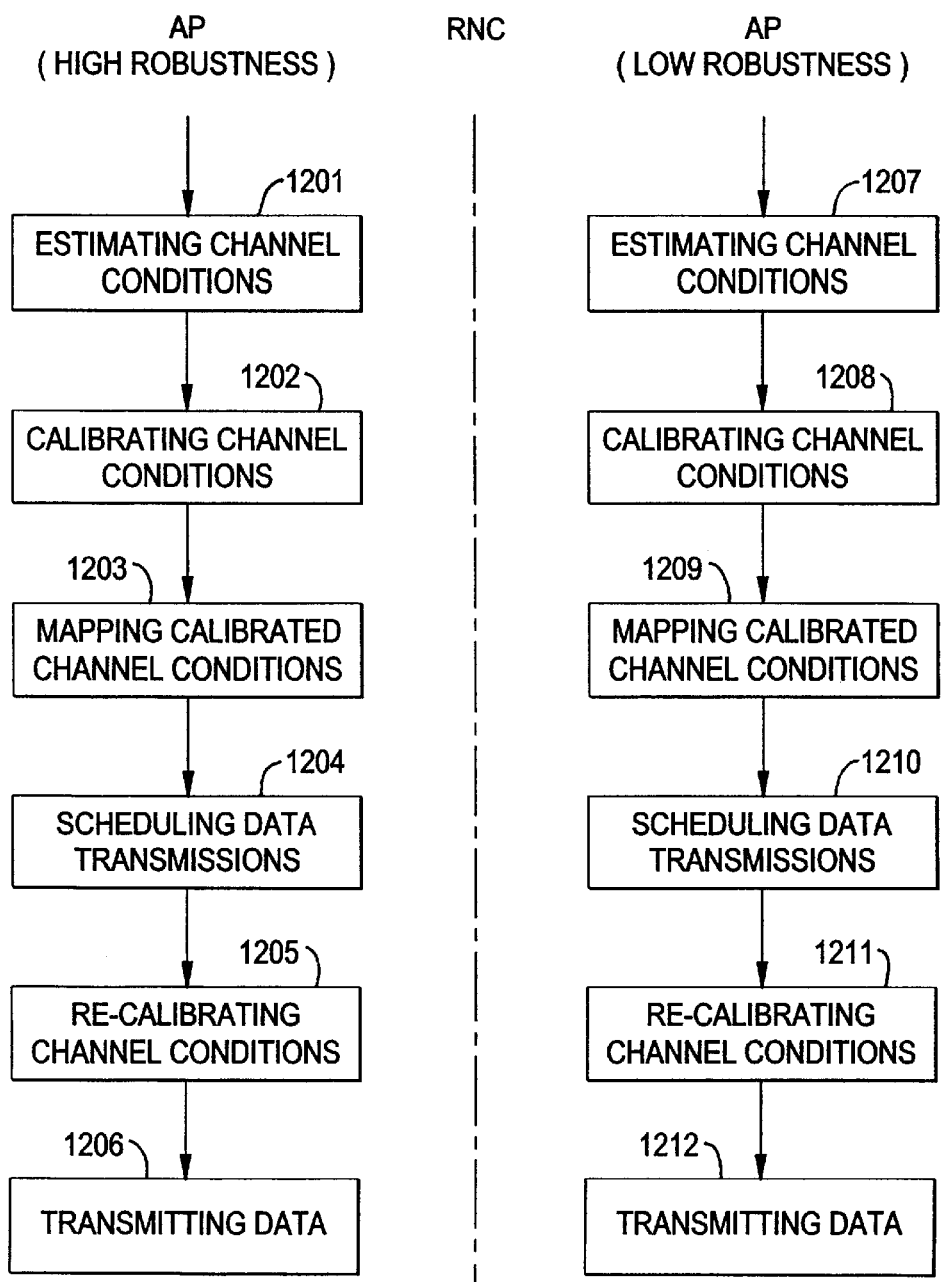
FIG. 12 is a flow chart showing the operations of another embodiment of the present invention.

FIG. 12 is a flowchart showing another embodiment of the present invention. The embodiment shown in FIG. 12 will also be explained, focusing on control of transmission power. In FIG. 12, the operations in Steps 1201, 1202, 1203, 1204, 1207, 1208, 1209 and 1210 are equivalent to those in Steps 1101, 1102, 1103, 1104, 1106, 1107, 1108 and 1109 of FIG. 11, respectively, and thus descriptions thereof are omitted to avoid redundancy. Suppose that the APs 140a and 140b are about to go into State I and preparing data transmissions to the ATs 150a–150h for the oncoming State I. As a result of the operations in Steps 1203 and 1209, the calibrated SIRs of the ATs 150a–150h are plotted with circler marks in FIGS. 13A and 13B. An important feature of this embodiment is that an excess transmission power is cut down when transmitting data to ATs in order to lower the overall interference level within the network. Looking, for instance, at the AT 150c in FIG. 13A, its calibrated SIR is plotted with a circular mark within the (16QAM+2/3 coding rate) range. It should be noted that the circular mark is well above the threshold line dividing between that range and the (16QAM+1/3 coding rate) range. Again, the circular mark for the AT 150c in FIG. 13A indicates the SIR expected to be measured when data is transmitted at the HP level. FIG. 13A suggests that the HP level may be lowered while maintaining the data rate of (16QAM+2/3 coding rate). If the HP level is lowered, the SIR is expected to go down. In Step 1205, the AP 140a calculates an amount of transmission power that may be reduced from the HP level and that is expected to bring down the calibrated SIR on FIG. 13A to the position indicated by a squarish mark which lays immediately above the threshold line. The amount of transmission power calculated in Step 1205 is considered an excess power because even if the HP level is lowered by that amount, the expected SIR will be still high enough to support the data rate determined in Step 1203. The AP 140a then moves to Step 1206, where it transmits data to the AT 150c at the HP level lowered by the amount calculated in Step 1205.

The AP 140b performs the same recalibration operation in Step 1211 and obtains the squarish marks as shown in FIG. 13B. In Step 1212, the AP 140b transmits data to an AT selected among the ATs 150e–150h at the LP level reduced by the amount represented by the difference between the circular and squarish marks. FIGS. 13C and 13D show both calibrated (circle) and recalibrated (square) SIRs of the AT 150a–150h for data transmissions in State II. According to this embodiment, since excess transmission power is cut off, the overall interference level within the network is reduced.

Figure 14:
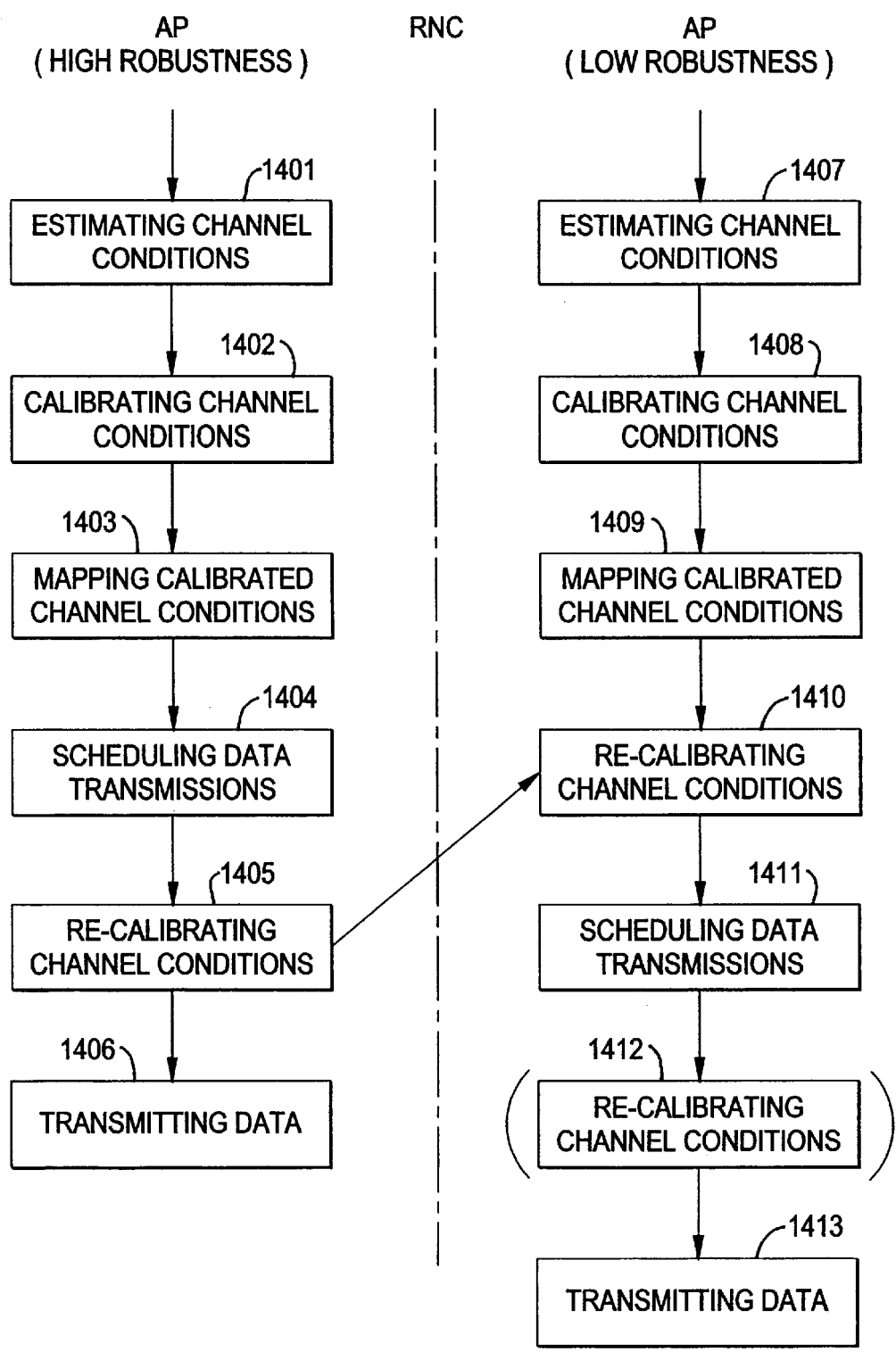
FIG. 14 is a flowchart showing the operations of another embodiment of the present invention.

FIG. 14 is a flowchart showing another embodiment of the present invention. This embodiment will again be explained, focusing on control of transmission power. Unique about this embodiment over the embodiment shown in FIG. 12 are the operations performed in Steps 1405 and 1410. Suppose that the APs 140a and 140b are about to enter State I and preparing data transmissions for the oncoming State I. In Steps 1403 and 1409, the APs 140a and 140b plot the calibrated SIRs of the AT 150a–150h as shown with the circular marks in FIGS. 15A and 15B, respectively. Suppose further that according to the scheduling operation performed in Steps 1404, the AT 150c is selected as the first AT to which the AP 140a will transmit data during the oncoming State I. In Step 1405, as performed in the embodiment shown in FIGS. 13A–13D, the AP 140a calculates an excess power that may be cut down from the HP level. The AP 140a then reports the excess power just calculated to the AP 140b though a RNC.

Since the transmission power of the AP 140a is to be lowered by the excess amount, interference that is to be caused by the AP 140a to the AT 150f receiving data from the AP 140b is expected to decrease. In Step 1410, the AP 140b calculates the expected decrease in interference based on the reported excess power and recalibrates the SIRs of the ATs 150e–150h. As a result, the SIRs of the ATs 150e–150h improve or go up from the circular marks to the squarish marks as shown in FIG. 15B. In fact, after the recalibration, the recalibrated SIR of the AT 150f, for instance, moves up into the (16QAM+2/3 coding rate) range from the (16QAM+1/3 coding rate) range. The AP 140b performs in Step 1411 scheduling of data transmissions to the ATs 150e–150h in the oncoming State I based on the recalibrated SIRs of the ATs 150e–150f. In Step 1412, which is optional, an excess transmission power is calculated. Suppose that as the result of the scheduling operation performed in Step 1411, the AT 150f is selected as the first AT to which the AP 140b will transmit data in the oncoming State I. In Step 1412, the AP 140b calculates any excess transmission power that may be cut down while maintaining the data rate of (16QAM+2/3 coding rate) as performed on the AT 150c in Step 1405. In the State I, the AP 140a transmits in Step 1406 data to the AT 150c at the HP level lowered by the excess power calculated in Step 1405. In Step 1413, the AP 140b transmits data to the AT 150f at the data rate of (16QAM+2/3 coding rate) at the LP level lowered by the excess power calculated in Step 1412.

When preparing data transmissions for State II, the APs 140a and 140b follow the other flows in FIG. 14, respectively. As a result, the recalibrated SIRs of the ATs 150e–150h move down from the circular marks to the squarish marks as shown in FIG. 15D. The recalibrated SIRs of the ATs 150a–150d move up from the circular marks to the squarish marks as shown in FIG. 5C.

FIGS. 16A and 16B show another embodiment of the present invention. This embodiment will be explained again, focusing on control of transmission power. In the adaptive data rate scheme, an amount of data that can be transmitted in one TDMA slot is defined as one packet of data. The size of one packet varies, depending on the data rates. Table 3 shows the sizes of packets for the data rates used in the above embodiments.

TABLE 3

| Packet Sizes | Maximum Data Rates | Modulation Schemes | Coding Rates | DRC |
|---|---|---|---|---|
| 70 bits | 689.4 kbps | QPSK | 1/3 | 1 |
| 105 bits | 1033 kbps | 8PSK | 1/3 | 2 |
| 140 bits | 1378 kbps | QPSK | 2/3 | 3 |
| 140 bits | 1378 kbps | 16QAM | 1/3 | 4 |
| 210 bits | 2070 kbps | 8PSK | 2/3 | 5 |
| 280 bits | 2761 kbps | 16QAM | 2/3 | 6 |

If data to be transmitted is not large enough to fill one packet for the determined data rate, the packet may be used anyway, carrying the data and an unused space for the balance. Alternatively, if data to be transmitted is not large enough to fill a packet for the determined data rate, the data rate may be lowered for the data to fit in the corresponding packet. Since the data rate is lowered, the required power level is also lowered.

The embodiment shown in FIGS. 16A–16B may be explained, using the flowchart shown in FIG. 14. Suppose that the APs 140a and 140b are about to enter State I and preparing data transmissions for the oncoming State I. In Steps 1403 and 1409, the Aps 140a and 140b plot the calibrated SIRs of the ATs 150a–150h as shown with the circular marks in FIGS. 16A and 16B. Suppose further that according to the scheduling operations performed in Step 1404, the AT 150c is selected as the first AT to which AP 140a is going to transmit data in the oncoming State I. As shown in FIG. 16A, the calibrated SIR (circle) of the AT 150c is plotted in the highest range (16QAM+2/3 coding rate), whose packet size is 280 bits (see Table 3). Suppose further that the data to be transmitted to the AT 150c is just 70 bits in length. According to Table 3, data having 70-bit length fits in a packet for (QPSK+1/3 coding rate) without any unused space therein. Then, the AP 140a in Step 1405 changes the data rate from (16QAM+2/3 coding rate) to (QPSK+1/3 coding rate) and brings down the calibrated SIR of the AT 150c immediately above the bottom threshold level of (QPSK+1/3 coding rate) as shown with the squarish mark in FIG. 16A. Since the data rate is to be going down, the required transmission power is expected to go down too. The AP 140a calculates the difference between the HP level and the minimum power required to transmit data at the data rate of (QPSK+1/3 coding rate) and reports the difference to the AP 140b.

The AP 140b, in Step 1410, calculates the expected decrease in interference based on the reported difference of transmission power and recalibrates the SIRs of the AT 150e–150h. As a result, the recalibrated SIRs of the ATs 150e–150h improves. For instance, the recalibrated SIR of the AT 150e goes up from the circular mark to the squarish mark. In fact, after the recalibration, the SIR of the AT 150e moves up into the (16QAM+2/3 coding rate) range from the (QPSK+1/3 coding rate) range. In Step 1411, the AP 140b performs scheduling of data transmissions to the ATs 150e–150h based on the recalibrated SIRs. Suppose that as the result of the scheduling operation in Step 1411, the AT 150e is selected as the first AT to which the AP 140b will transmit data in the oncoming State I. The AP 140b then optionally calculates an excess transmission power in Step 1412. In the State I, the AP 140a transmits the data to the AT 150c at the data rate of (QPSK+1/3 coding rate), using a 70 bit-size packet, at the minimum power level required to achieve the data rate (Step 1406). In Step 1413, the AP 140b transmits data to the AT 150e at the data rate of (16QAM+2/3 coding rate) at the LP level lowered by the excess amount calculated in Step 1412.

FIGS. 17A and 17B show another embodiment of the present invention. This embodiment will be explained again, focusing on control of transmission, using the flowchart shown in FIG. 14. Suppose that the APs 140a and 140b are about to enter State I and preparing data transmissions for the oncoming State I. In Steps 1403 and 1409, the APs 140a and 140b plot the calibrated SIRs of the ATs 150a–150h as shown with the circular marks in FIGS. 17A and 17B. Suppose further that according to the scheduling operations performed in Step 1404, the AT 150c is selected as the first AT to which AP 140a is going to transmit data in the oncoming State I. As shown in FIG. 17A, the calibrated SIR (circle) of the AT 150c is plotted below but close to the threshold line dividing the (16QAM+2/3 coding rate) range and the (16QAM+1/3 coding rate) range. The AP 140a in Step 1405 calculates an additional power needed to bring up the circular mark of the AT 150c immediately above the bottom threshold level of (16QAM+2/3 coding rate) as shown with the squarish mark in FIG. 17A and reports the additional power to the AP 140b.

The AP 140*b*, in Step 1410, calculates the expected increase in interference based on the reported additional transmission power and recalibrates the SIRs of the AT 150*e*–150*h*. As a result, the recalibrated SIRs of the ATs 150*e*–150*h* deteriorate and go down from the circular marks to the squarish marks. In fact, after the recalibration, for instance, the SIR of the AT 150*f* moves down into the (QPSK+2/3 coding rate) range from the (16QAM+1/3 coding rate) range. In Step 1411, the AP 140*b* performs scheduling of data transmissions to the ATs 150*e*–150*h* based on the recalibrated SIRs. Suppose that as the result of the scheduling operation in Step 1411, the AT 150*f* is selected as the first AT to which the AP 140*b* will transmit data in the oncoming State I. The AP 140*b* then optionally calculates an excess transmission power in Step 1412. In the State I, the AP 140*a* transmits the data to the AT 150*c* at the data rate of (16QAM+2/3 coding rate) at the minimum power level required to achieve that data rate (Step 1406). In Step 1413, the AP 140*b* transmits data to the AT 150*f* at the data rate of (QPSK+2/3 coding rate) at the LP level lowered by the excess amount calculated in Step 1412. This embodiment is advantageous when a particular AT, such as the AT 150*c*, is requesting to receive a high volume of data.

Figure 18:
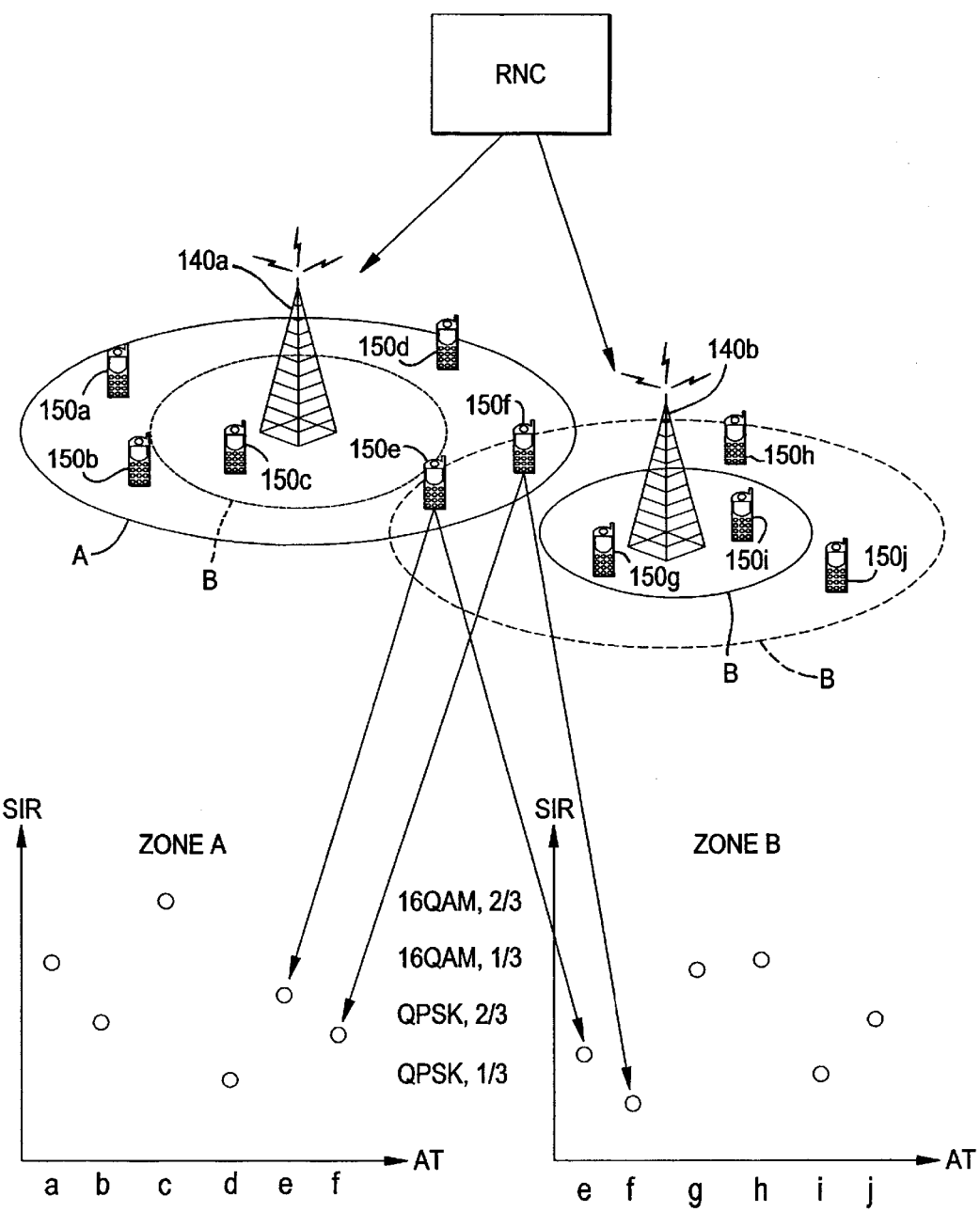
FIG. 18 is a graphical representation showing access points wirelessly communicating with access terminals and their geographical relationships whereon another embodiment of the present invention is implemented.

FIG. 18 shows another embodiment of the present invention. As shown in FIG. 18, there are two APs 140*a* and 140*b* and ten ATs 150*a*–150*j*. Also, the transmission parameters of the APs 140*a* and 140*b* are controlled between alternating States I and II. In State I, the AP 140*a* will perform a transmission providing high robustness, and the AP 140*b* will perform a transmission providing low robustness. In State II, their roles will be switched. Also, in this embodiment, the determination of data rates for the ATs and the scheduling of data transmissions are performed by a radio network controller (RNC). Among the ATs, the ATs 150*e* and 150*f* are located nearly equidistant from the APs 140*a* and 140*b*. In State I, the ATs 150*e* and 150*f* are both located in the zone A, whereas in State II, they are located in the zone B.

As explained above, the APs 140*a* and 140*b* periodically send out pilot symbols at a constant power level. Upon reception of a pilot symbol, the ATs 150*a*–150*j* estimate the channel conditions of their downlink traffic channels and send back the channel condition information to the AP 140*a* and/or 140*b*. By returning the channel condition information to the APs 140*a* and 140*b*, each AT registers itself with either or both of the APs 140*a* and 140*b*. Since the ATs 150*e* and 150*f* are in positions to be able to receive data from both APs 140*a* and 140*b*, they register with both APs. Accordingly, in scheduling data transmissions from the APs 140*a* and 140*b*, the RNC lists the ATs 150*e* and 150*f* in common on the transmission schedule lists of the APs 140*a* and 140*b*. The ATs 150*e* and 150*f* can thereby receive data from the AP 140*a* in State I and from the AP 140*b* in State II. Therefore, their chances of receiving data increase. The ATs 150*a* and 150*b* may be able to receive data simultaneously from the APs 140*a* and 140*b* if they have two receivers. The transmission parameters of the APs 140*a* and 140*b* are controlled so that an overlapping area of the zone A and B will be created. The ATs 150*a* and 150*b* can receive data from the APs 140*a* and 140*b* simultaneously if the ATs 150*a* and 150*b* are situated in the overlapping area.

Figure 19:
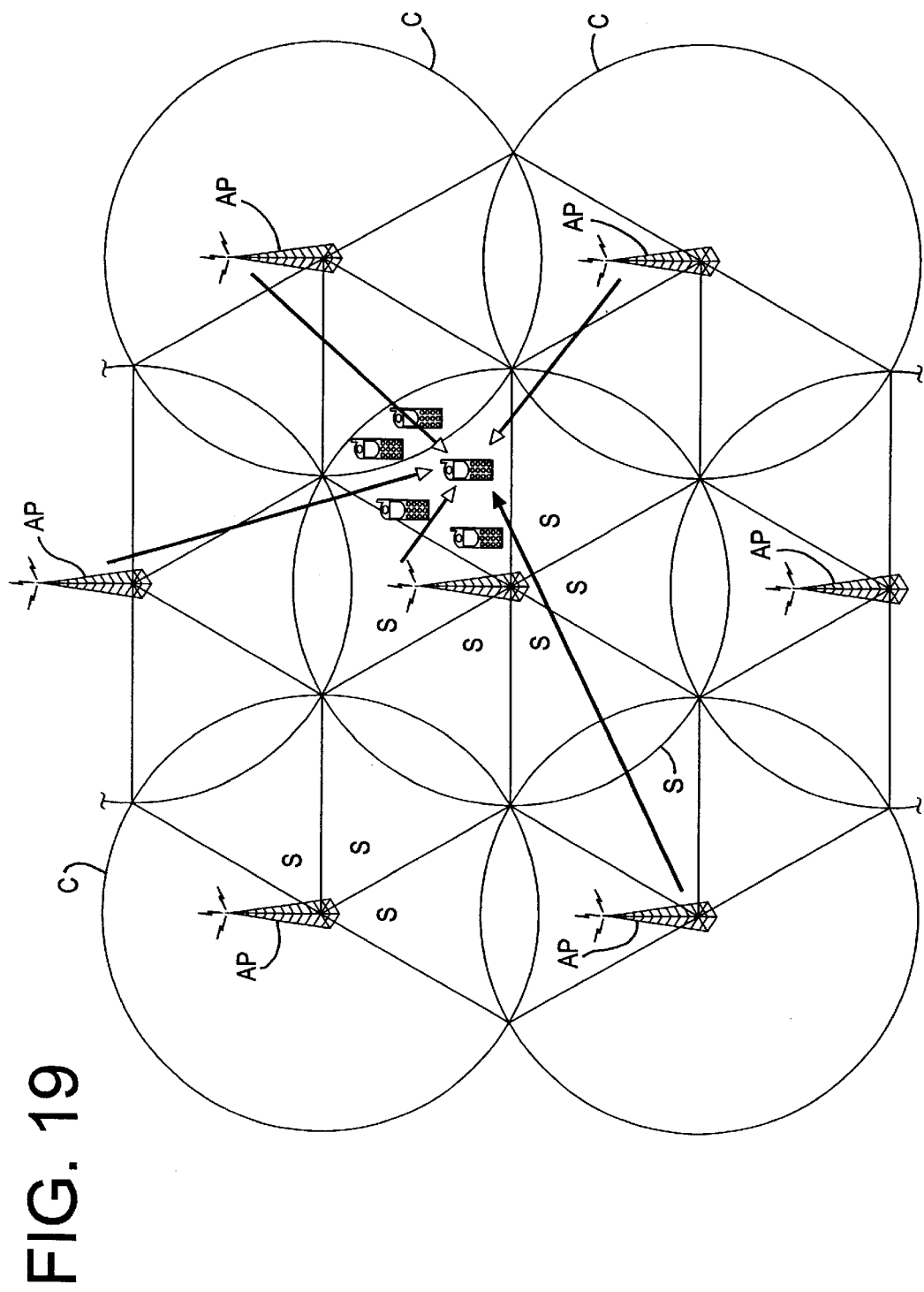
FIG. 19 is a graphical representation showing access points and cells and sectors formed thereby.

Control of the transmission parameters are possible in each of the sectors in a cell (C). As shown in FIG. 19, each AP forms a circular cell around it. Each AP has three or six transmitters that transmit data at equal angular intervals and each form a fan-shaped sector (S). The control of the transmission parameters is possible on individual sectors.

What have been described are preferred embodiments of the present invention. The foregoing description is intended to be exemplary and not limiting in nature. Persons skilled in the art will appreciate that various modifications and additions may be made while retaining the novel and advantageous characteristics of the invention and without departing from its spirit. Accordingly, the scope of the invention is defined solely by the appended claims as properly interpreted.

What is claimed is:

1. A transmission control scheme for wireless digital networks comprised of a plurality of access points communicating with access terminals, in which transmission parameters of the access points are collectively controlled so that neighboring access points will not transmit signals simultaneously with transmission parameters providing high robustness, the scheme comprising the steps of:

requesting a permission to transmit with transmission parameters achieving high robustness;

receiving a permission, wherein the permission is given with priority to an access point that has large data to be transmitted; and while in possession of the permission, making a transmission with transmission parameters achieving high robustness.

2. A transmission control scheme as defined in claim 1, wherein the transmission parameters include any of transmission power, a modulation scheme and a coding rate.

3. A transmission control scheme for wireless digital networks comprised of a plurality of access points communicating with access terminals, in which transmission parameters of the access points are collectively controlled so that neighboring access points will not transmit signals simultaneously with transmission parameters providing high robustness, the scheme comprising the steps of:

requesting a permission to transmit with transmission parameters achieving high robustness;

receiving a permission wherein the permission is given with priority to an access point that has a large number of access terminals to serve; and while in possession of the permission, making a transmission with transmission parameters achieving high robustness.

4. A transmission control scheme for wireless digital networks comprised of a plurality of access points communicating with access terminals, comprising the steps of:

(a) acknowledging a condition of communication channel with an access terminal that is estimated to be realized;

(b) determining a data transmission rate highest feasible at a given transmission power level under the estimated channel condition;

(c) revising the determined data transmission rate based on a length of data to be transmitted to the access terminal;

(d) revising the transmission power level to a level at which the revised data transmission rate is highest feasible; and (e) transmitting data to the access terminal at the revised transmission rate at the revised transmission power level.

5. A transmission control scheme as defined in claim 4, further comprising the step of, in response to the revision of the transmission power level by an access point, calibrating the determined data transmission rate in view of an expected change in interference due to the revision of the power level by the neighboring access point.

6. A transmission control scheme as defined in claim 4, wherein the channel condition is realized by means of any one of SIR, SNIR, SNR, CI, FJN, FER, BER and DRC.

7. A transmission control scheme as defined in claim 4, wherein the channel condition is-measured by the access terminal.

8. An access point that wirelessly communicates with access terminals, comprising:
   a transmission control that requests a permission to transmit with transmission parameters achieving high robustness so that neighboring access points will not transmit simultaneously with transmission parameters providing high robustness, the permission being given with priority to an access point that has large data to be transmitted; and
   a transmitter that, while in possession of the permission, performs a data transmission with transmission parameters achieving high robustness.

9. An access point that wirelessly communicates with access terminals, comprising:
   a transmission control that requests a permission to transmit with transmission parameters achieving high robustness so that neighboring access points will not transmit simultaneously with transmission parameters providing high robustness, the permission being given with priority to an access point that has a large number of access terminals to serve; and
   a transmitter that, while in possession of the permission, performs a data transmission with transmission parameters achieving high robustness.

10. An access point that wirelessly communicates with an access terminal, comprising:
    a channel condition detector that acknowledges an estimated condition of communication channel to be realized with the access terminal;
    a transmission rate control that determines a data transmission rate highest feasible at a given transmission power level under the estimated channel condition and then revises the determined data transmission rate based on a length of data to be transmitted to the access terminal;
    a transmission power control that revises the given transmission power level to a level at which the revised data transmission rate is to be highest feasible;
    a transmitter that transmits data to the access terminal at the revised transmission rate at the revised transmission power level.

11. An access point as defined in claim 10, wherein the channel condition is realized by means of any one of SIR, SNIR, SNR, CI, EIN, FIER, BER and DRC.

12. An access point as defined in claim 10, wherein the channel condition is measured by the access terminal.

13. A transmission control scheme for wireless digital network comprised of a plurality of access points communicating with access terminals, comprising the steps of:

(a) acknowledging an estimated condition of communication channel to be realized with an access terminal;

(b) revising the estimated channel condition in view of a change of a transmission power level at which a neighboring access point is to perform a data transmission;

(c) determining a data transmission rate highest feasible at a given transmission power level under the revised channel condition; and (d) transmitting to the access terminal at the determined highest transmission rate at the given transmission power level.

14. A transmission control scheme as defined in claim 13, further comprising the step of determining a power level lower than the given power level at which the determined highest transmission rate is to be still feasible wherein data is to be transmitted at the determined highest transmission rate at the determined lower power level.

15. A transmission control scheme as defined in claim 13, wherein the channel condition is realized by means of any one of SIR, SNIR, SNR, CI, E/N, FER, BER and DRC.

16. A transmission control scheme as defined in claim 13, wherein the channel condition is, measured by the access terminal.

17. An access point that wirelessly communicates with an access terminal, comprising:
    a channel condition detector that acknowledges an estimated condition of communication channel to be realized with an access terminal and revises the estimated condition in view of a change of a transmission power level at which a neighboring access point is to perform a data transmission;
    a transmission rate control that determines a data transmission rate highest feasible at a given transmission power level under the revised channel condition; and
    a transmitter that transmits to the access terminal at the determined highest transmission rate at the given transmission power level.

18. An access point as defined in claim 17, further comprising a transmission power control that determines a power level lower than the given power level at which the determined highest transmission rate is to be still feasible, wherein the transmitter transmits to the access terminal at the determined highest transmission rate at the determined lower power level.

19. An access point as defined in claim 17, wherein the channel condition is realized the means of any one of SIR, SNIR, SNR, CI, EIN, FER, BER and DRC.

20. An access point as defined in claim 17, wherein the channel condition is measured by the access terminal.

* * * * *